United States Patent
Asari et al.

(10) Patent No.: US 12,034,333 B2
(45) Date of Patent: Jul. 9, 2024

(54) STATOR AND MOTOR COMPRISING SAID STATOR

(71) Applicant: DAIKIN INDUSTRIES, LTD., Osaka (JP)

(72) Inventors: Tsukasa Asari, Osaka (JP); Naohiro Kido, Osaka (JP); Yoshinari Asano, Osaka (JP); Hiroshi Hibino, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 362 days.

(21) Appl. No.: 17/442,545

(22) PCT Filed: Mar. 23, 2020

(86) PCT No.: PCT/JP2020/012646
§ 371 (c)(1),
(2) Date: Sep. 23, 2021

(87) PCT Pub. No.: WO2020/196379
PCT Pub. Date: Oct. 1, 2020

(65) Prior Publication Data
US 2022/0190652 A1    Jun. 16, 2022

(30) Foreign Application Priority Data
Mar. 28, 2019 (JP) ................. 2019-064556

(51) Int. Cl.
*H02K 1/14* (2006.01)
*H02K 1/04* (2006.01)
*H02K 1/18* (2006.01)

(52) U.S. Cl.
CPC ............... *H02K 1/145* (2013.01); *H02K 1/04* (2013.01); *H02K 1/187* (2013.01); *H02K 2213/03* (2013.01)

(58) Field of Classification Search
CPC .......... H02K 1/145; H02K 1/04; H02K 1/187; H02K 2213/03
(Continued)

(56) References Cited

U.S. PATENT DOCUMENTS

2008/0136272 A1    6/2008  Ishikawa et al.
2008/0315700 A1*  12/2008  Ishikawa ................ H02K 1/243
                                              310/156.66
(Continued)

FOREIGN PATENT DOCUMENTS

DE    10 2016 102 573 A1    8/2016
EP     2 006 978 A2    12/2008
(Continued)

OTHER PUBLICATIONS

European Search Report of corresponding EP Application No. 20 77 9349.8 dated Nov. 11, 2022.
(Continued)

*Primary Examiner* — Jose A Gonzalez Quinones
(74) *Attorney, Agent, or Firm* — Global IP Counselors, LLP

(57) ABSTRACT

A stator includes stator iron cores stacked in a rotor axial direction, and an interphase insulating member arranged between the stator iron cores. Each of the stator iron cores includes a circular back yoke and a stator claw magnetic pole that protrudes from the back yoke in a rotor radial direction. The interphase insulating member includes an insulating portion, arranged between adjacent ones of the stator iron cores, and a support. The stator claw magnetic pole is in contact with the support in at least one of a rotor circumferential direction and the rotor radial direction.

12 Claims, 12 Drawing Sheets

(58) Field of Classification Search
USPC .................. 310/156.66, 254.1, 257, 263
See application file for complete search history.

(56) References Cited

U.S. PATENT DOCUMENTS

2009/0001843  A1*  1/2009  Enomoto ............... H02K 1/145
                                                           310/257
2016/0248283  A1    8/2016  Takemoto et al.

FOREIGN PATENT DOCUMENTS

| JP | 2008-148397 A | 6/2008 |
| JP | 2008-148398 A | 6/2008 |
| JP | 2009-5421 A   | 1/2009 |

OTHER PUBLICATIONS

International Search Report of corresponding PCT Application No. PCT/JP2020/012646 dated Jun. 16, 2020.
International Preliminary Report of corresponding PCT Application No. PCT/JP2020/012646 dated Sep. 28, 2021.

* cited by examiner

STATOR AND MOTOR COMPRISING SAID STATOR

CROSS-REFERENCE TO RELATED APPLICATIONS

This U.S. National stage application claims priority under 35 U.S.C. § 119(a) to Japanese Patent Application No. 2019-064556, filed in Japan on Mar. 28, 2019, the entire contents of which are hereby incorporated herein by reference.

BACKGROUND

Field of the Invention

The present disclosure relates to a stator and a motor including the stator.

Background Information

Japanese Laid-Open Patent Publication No. 2008-148397 discloses a motor including a three-phase claw pole stator. In the motor, the stator iron cores of the respective phases of the stator in the circumferential direction of the rotor are stacked such that the positions of the stator iron cores of the phases of electrical angles are different from each other by 120°. A circular coupling plate made of a non-magnetic plastic material is arranged between the stator iron cores of the phases. The stator iron core of each phase is positioned by the coupling plate.

In the stator of Japanese Laid-Open Patent Publication No. 2008-148397, one side surface of the coupling plate includes a projection, and one side surface of each stator iron core includes a recess. The stator iron core is positioned relative to the coupling plate by engaging the projection with the recess. The projections of the coupling plate are arranged on the opposite sides of the coupling plate. Thus, the positioning of the stator iron cores of the respective phases relative to the coupling plate causes the stator iron cores to be positioned relative to each other. However, to position the stator iron cores of the phases, each stator iron core needs a recess. This complicates the structure of the stator iron core.

It is an object of the present disclosure to provide a stator capable of positioning stator iron cores relative to each other without complicating the structure of each stator iron core and provide a motor including the stator.

A stator that solves the problem includes: stator iron cores stacked in an axial direction of a rotor; and an interphase insulating member arranged between the stator iron cores. The stator iron cores each include a circular back yoke and a stator claw magnetic pole that protrudes from the back yoke in a radial direction of the rotor. The interphase insulating member includes an insulating portion, arranged between adjacent ones of the stator iron cores, and a support. The stator claw magnetic pole is in contact with the support in at least one of a circumferential direction of the rotor and the radial direction of the rotor.

In this structure, each stator iron core is positioned through the contact between the stator claw magnetic pole and the support in at least one of the circumferential direction of the rotor and the radial direction of the rotor. This allows the stator iron cores to be positioned relative to each other without complicating the structures of the stator iron cores.

In the above-described stator, it is preferred that the support include a first support extending in the axial direction of the rotor from a first surface of the insulating portion in the axial direction of the rotor and a second support extending in the axial direction of the rotor from a second surface on a side opposite from the first surface of the insulating portion and that the first support be located at a position that differs from a position of the second support in the circumferential direction of the rotor.

In this structure, one of the stator iron cores adjacent to the interphase insulating member is positioned through the contact between the stator claw magnetic pole and the first support, and the other one of the stator iron cores adjacent to the interphase insulating member is positioned through the contact between the stator claw magnetic pole and the second support. This allows the stator iron cores to be positioned relative to each other with the positions of the stator iron cores located at different positions in the circumferential direction of the rotor.

In the above-described stator, it is preferred that the stator iron cores each include a first stator and a second stator, that the first stator include a circular first back yoke and a first stator claw magnetic pole that protrudes from the first back yoke in the radial direction of the rotor and that the second stator include a circular second back yoke and a second stator claw magnetic pole that protrudes from the second back yoke in the radial direction of the rotor. This structure simplifies the structures of the stator iron cores.

In the above-described stator, it is preferred that the first stator claw magnetic pole protrude from the first back yoke in the radial direction of the rotor and extends at least toward the second stator in the axial direction of the rotor and that the second stator claw magnetic pole protrude from the second back yoke in the radial direction of the rotor, and extend at least toward the first stator in the axial direction of the rotor such that a void is created between the first stator claw magnetic pole and the second stator claw magnetic pole in the circumferential direction of the rotor.

In this structure, the stator iron core is configured such that the first stator claw magnetic pole and the second stator claw magnetic pole are laid out in the circumferential direction of the rotor. This structure increases the areas of the stator iron cores opposing the rotor and thus contributes to generating torque in a stable manner.

In the above-described stator, it is preferred that the insulating portion be in contact with, in the axial direction of the rotor, a tip of one of the stator claw magnetic poles extending toward the insulating portion in the first stator claw magnetic pole and the second stator claw magnetic pole of the stator iron core adjacent to the insulating portion.

In this structure, the tip of one of the first and second stator claw magnetic poles is supported by the insulating portion in the axial direction of the rotor so as to reinforce the stator claw magnetic pole. This improves the strength of the stator iron core.

In the above-described stator, it is preferred that the support be in contact with, in the circumferential direction of the rotor, the first stator claw magnetic pole and the second stator claw magnetic pole of the stator iron core adjacent to the insulating portion.

In this structure, in the stator iron core adjacent to the insulating portion, the first stator is positioned in the circumferential direction of the rotor through the contact between the first stator claw magnetic pole and the support and the second stator is positioned in the circumferential direction of the rotor through the contact between the second stator claw magnetic pole and the support. This allows the first stator and the second stator to be positioned relative to each other in the circumferential direction of the rotor.

In the above-described stator, it is preferred that the support be in contact with, in the circumferential direction of the rotor, one of the first stator claw magnetic pole and the second stator claw magnetic pole of the stator iron core adjacent to the insulating portion and be in contact with, in the radial direction of the rotor, the other one of the first stator claw magnetic pole and the second stator claw magnetic pole.

In this structure, in the stator iron core adjacent to the insulating portion, the first stator is positioned in one of the circumferential direction of the rotor and the radial direction of the rotor through the contact between the first stator claw magnetic pole and the support and the second stator is positioned in the other one of the circumferential direction of the rotor and the radial direction of the rotor through the contact between the second stator claw magnetic pole and the support. This allows the first stator and the second stator to be positioned relative to each other in the circumferential direction of the rotor and the radial direction of the rotor.

In the above-described stator, it is preferred that the stator iron cores be each formed using a powder magnetic core.

This structure prevents the generation of eddy currents and thus contributes to reducing eddy-current losses. Additionally, the degree of freedom in the shape of the stator iron core improves.

A motor that solves the above-described problem includes the stator and the rotor.

In this structure, each stator iron core is positioned through the contact between the stator claw magnetic pole and the support in at least one of the circumferential direction of the rotor and the radial direction of the rotor. This allows the stator iron cores to be positioned relative to each other without complicating the structures of the stator iron cores.

DETAILED DESCRIPTION OF EMBODIMENT(S)

First Embodiment

A motor 1 according to a first embodiment will now be described. The scope of the present disclosure is defined not by the detailed description but by the claims and their equivalents, and all variations within the scope of the claims and their equivalents are to be construed as being included in the disclosure.

Figure 1:
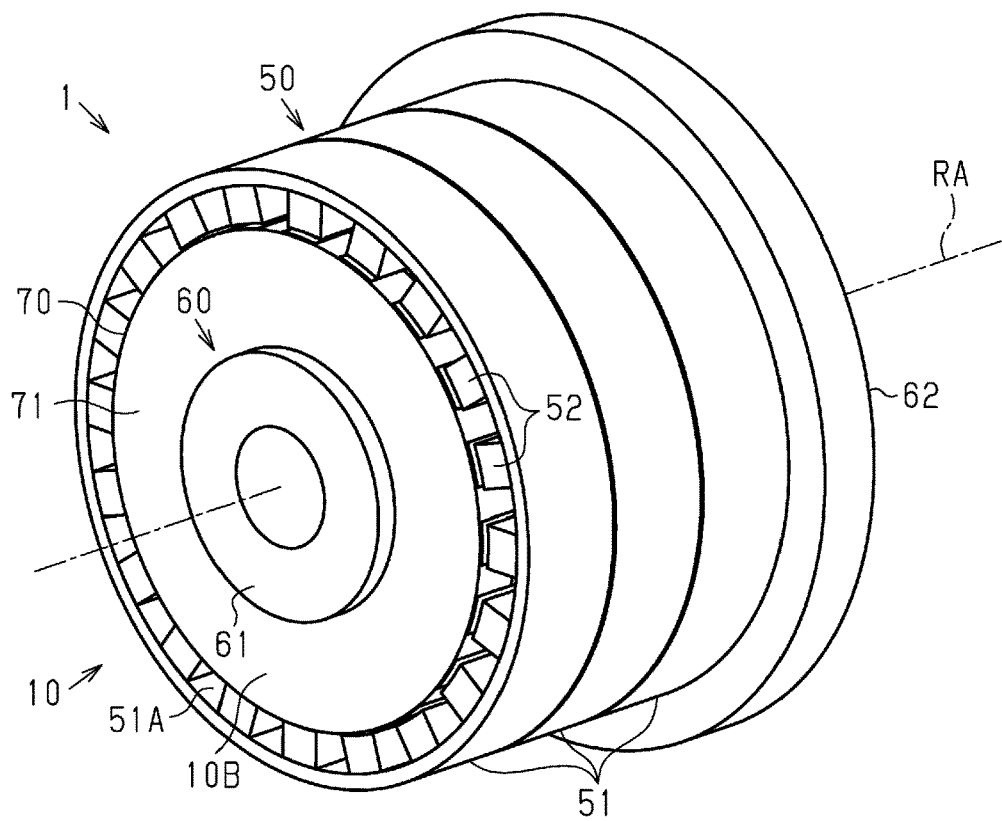
FIG. 1 is a perspective view showing a motor according to a first embodiment.

As shown in FIG. 1, the motor 1 is of an outer-rotor type. The motor 1 is installed in, for example, an air conditioner (not shown). For example, the motor 1 is capable of driving a sirocco fan (not shown) installed in the air conditioner. The motor 1 includes a claw-pole stator 10 (hereinafter referred to as the stator 10), a rotor 50 capable of rotating relative to the stator 10, and a fixing member 60 capable of fixing the stator 10.

The rotor 50 includes a rotation axis RA. The rotor 50 is capable of rotating about the rotation axis RA. The rotor 50 includes rotor iron cores 51 stacked in the axial direction of the rotation axis RA and magnets 52 arranged on an inner circumferential surface 51A of each rotor iron core 51. The axial direction of the rotation axis RA coincides with the axial direction of the rotor 50 (hereinafter referred to as the axial direction). Each rotor iron core 51 is, for example, annular. The number of the rotor iron cores 51 coincides with the number of stator iron cores 11 (refer to FIG. 2) included in the stator 10. For example, the number of the rotor iron cores 51 is three. The magnets 52 are, for example, laid out on the inner circumferential surface 51A of each rotor iron core 51 in the circumferential direction so as to oppose an outer circumferential surface 11D (refer to FIG. 2) of the corresponding stator iron core 11. For example, twenty magnets 52 are laid out in the circumferential direction of the rotation axis RA on the inner circumferential surface 51A of each rotor iron core 51. The circumferential direction of the rotation axis RA coincides with the circumferential direction of the rotor 50 (hereinafter referred to as the circumferential direction). The magnets 52 are, for example, permanent magnets.

Figure 2:
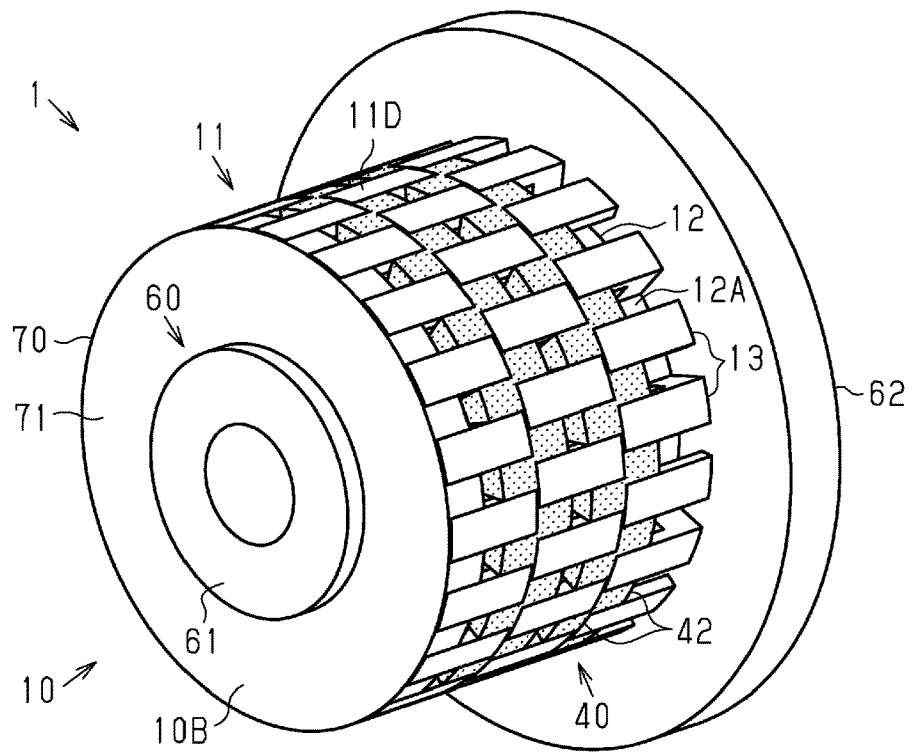
FIG. 2 is a perspective view showing the motor in FIG. 1 without the rotor.

As shown in FIG. 2, the stator 10 includes the stator iron cores 11 stacked in the axial direction and interphase insulating members 40 each arranged between the corresponding stator iron cores 11. The stator iron cores 11 are each formed using a powder magnetic core. The number of the stator iron cores 11 is two or more. For example, the number of the stator iron cores 11 is three. The stator 10 of the present embodiment is a three-phase claw-pole stator with a three-dimensional magnetic structure in which the stator iron cores 11 are stacked in the order of U-phase, V-phase, and W-phase. In the example shown in FIG. 2, the stator iron cores 11 of the respective phases in the circumferential direction are stacked such that the positions of the stator iron cores 11 of the phases of electrical angles are different from each other by 120°.

Each interphase insulating member 40 is non-magnetic. The interphase insulating member 40 is made of, for example, plastic. Each interphase insulating member 40 is arranged between ones of the stator iron cores 11 adjacent to each other in the axial direction such that one of the stator iron cores 11 is insulated from the other one of the stator iron cores 11. The number of the interphase insulating members 40 is determined by the number of the stator iron cores 11. For example, the number of the interphase insulating members 40 is two. The dotted parts in FIG. 2 illustrate the interphase insulating members 40.

Figure 3:
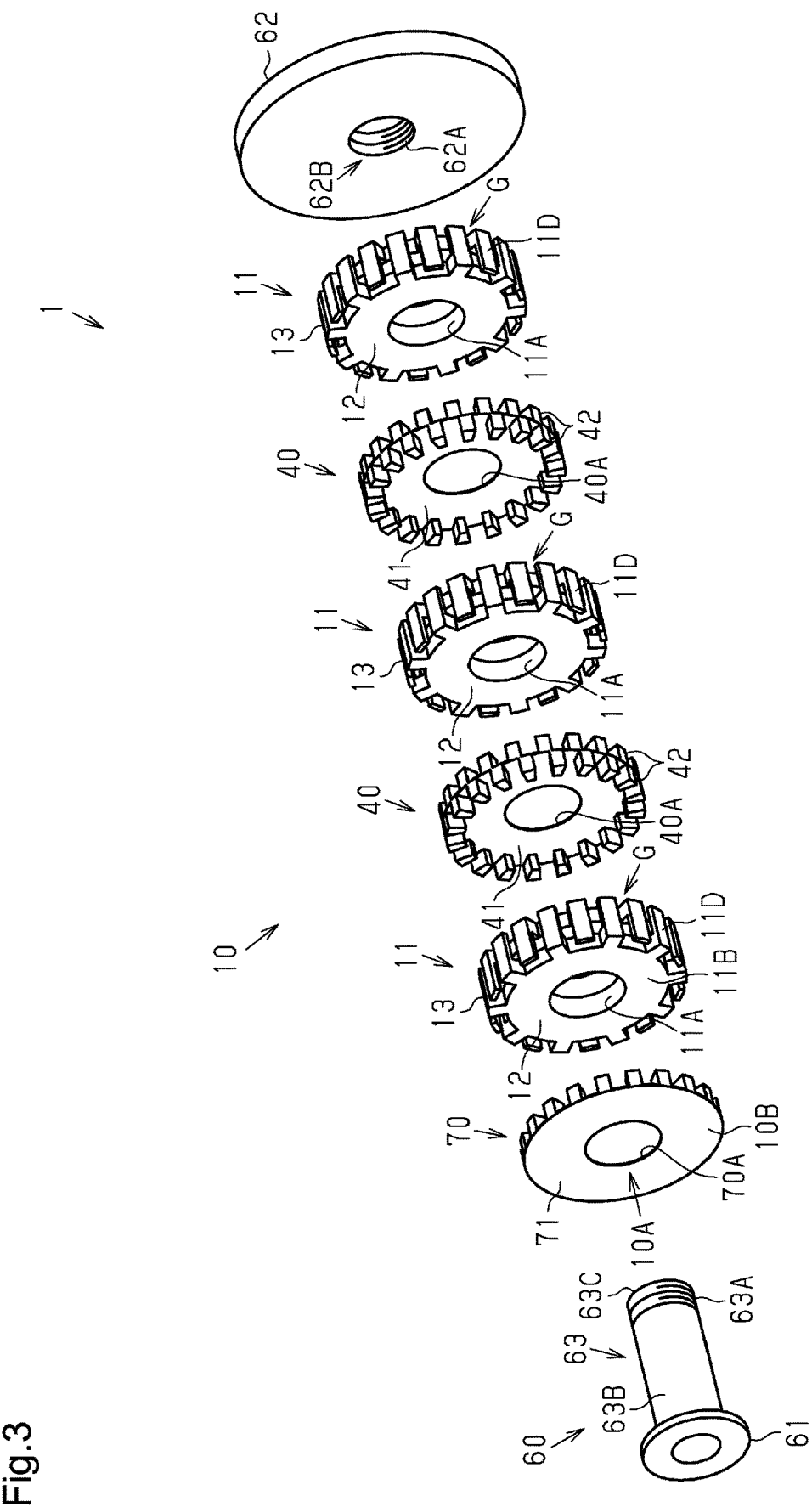
FIG. 3 is an exploded perspective view showing the motor in FIG. 2.

As shown in FIG. 3, the stator 10 further includes an insulating member 70 arranged between the stator iron cores 11 and the fixing member 60. The insulating member 70 is non-magnetic. The insulating member 70 is made of, for example, plastic. The insulating member 70 is arranged between the stator iron cores 11 and the fixing member 60 such that the stator iron cores 11 and the fixing member 60 are insulated from each other. The insulating member 70 is arranged in at least one of a section between the stator iron cores 11 and a first end plate 61 of the fixing member 60 and a section between the stator iron cores 11 and a second end plate 62 of the fixing member 60 in the axial direction. In the example shown in FIG. 3, the insulating member 70 is arranged between the stator iron cores 11 and the first end plate 61 of the fixing member 60.

The insulating member 70 has the shape of one of the two pieces into which each interphase insulating member 40 is split along a plane that is orthogonal to the axial direction. In this case, the insulating member 70 includes a flat end surface 71 opposing the first end plate 61 of the fixing member 60. The end surface 71 of the insulating member 70 defines one end surface 10B of the stator 10. The insulating member 70 may have the substantially same shape as the interphase insulating member 40 and may have the shape of a flat plate. The shape of one of the two pieces into which the interphase insulating member 40 is split along the plane that is orthogonal to the axial direction may be formed on a portion of the second end plate 62 opposing the stator iron cores 11. The stator 10 does not have to include the insulating member 70. In this example, the end surface 10B of the stator 10 is formed by an end surface 11B of the U-phase stator iron core 11 opposing the first end plate 61 of the fixing member 60.

The stator 10 includes a through-hole 10A extending through in the axial direction. For example, each stator iron core 11 includes a through-hole 11A extending through in the axial direction, each interphase insulating member 40 includes a through-hole 40A extending through in the axial direction, the insulating member 70 includes a through-hole 70A extending through in the axial direction. The through-hole 11A of each stator iron core 11, the through-hole 40A of each interphase insulating member 40, and the through-hole 70A of the insulating member 70 form the through-hole 10A of the stator 10. The through-hole 11A of each stator iron core 11, the through-hole 40A of each interphase insulating member 40, and the through-hole 70A of the insulating member 70 have the substantially same size.

The fixing member 60 includes the first end plate 61, the second end plate 62, and one or more rod portions 63. The first end plate 61 has the shape of, for example, a circular plate. The first end plate 61 is arranged in contact with the end surface 10B in the axial direction. For example, the first end plate 61 is arranged in contact with the end surface 71 of the insulating member 70. In an example in which the stator 10 does not include the insulating member 70, the first end plate 61 is arranged in contact with the end surface 11B of the U-phase stator iron core 11. The second end plate 62 has the shape of, for example, a circular plate. For example, the second end plate 62 has the shape of a circular plate with a larger diameter than the first end plate 61. The second end plate 62 is arranged in contact with the other end surface 10C (refer to FIG. 8) in the axial direction in the stator 10. The other end surface 10C of the stator 10 is defined by an end surface 11C (refer to FIG. 8) of the W-phase stator iron core 11. For example, the second end plate 62 is arranged in contact with the end surface 11C of the W-phase stator iron core 11.

The rod portion 63 is insertable into the through-hole 10A of the stator 10. The rod portion 63 and the first and second end plates 61, 62 are fixed with the rod portion 63 inserted into the through-hole 10A of the stator 10 and the stator 10 held between the first end plate 61 and the second end plate 62 in the axial direction. One of the first end plate 61 and the second end plate 62 is formed integrally with the rod portion 63. The rod portion 63 of the present embodiment is formed integrally with the first end plate 61. The rod portion 63 may be formed integrally with the second end plate 62.

The rod portion 63 includes a thread groove 63A. The thread groove 63A is formed on an outer circumferential surface 63B of the rod portion 63. For example, the thread groove 63A is formed on a tip 63C of the rod portion 63. At least one of the first end plate 61 and the second end plate 62 includes a thread groove 62A that can be threaded to the thread groove 63A of the rod portion 63. The second end plate 62 includes an insertion hole 62B into which the rod portion 63 is insertable. The insertion hole 62B extends through, for example, in the axial direction. The insertion hole 62B does not have to extend through in the axial direction. The thread groove 62A is formed in the insertion hole 62B of the second end plate 62. When the fixing member 60 includes more than one rod portions 63, the first end plate 61 and the second end plate 62 may both include the thread groove 62A. The rod portion 63 is fixed to the second end plate 62 by inserting the rod portion 63 into the insertion hole 62B of the second end plate 62 through the through-hole 10A of the stator 10 and fastening the thread groove 63A of the rod portion 63 to the thread groove 62A of the second end plate 62. Thus, the stator 10 is fixed so as to be held between the first end plate 61 and the second end plate 62 (refer to FIG. 8).

Figure 4:
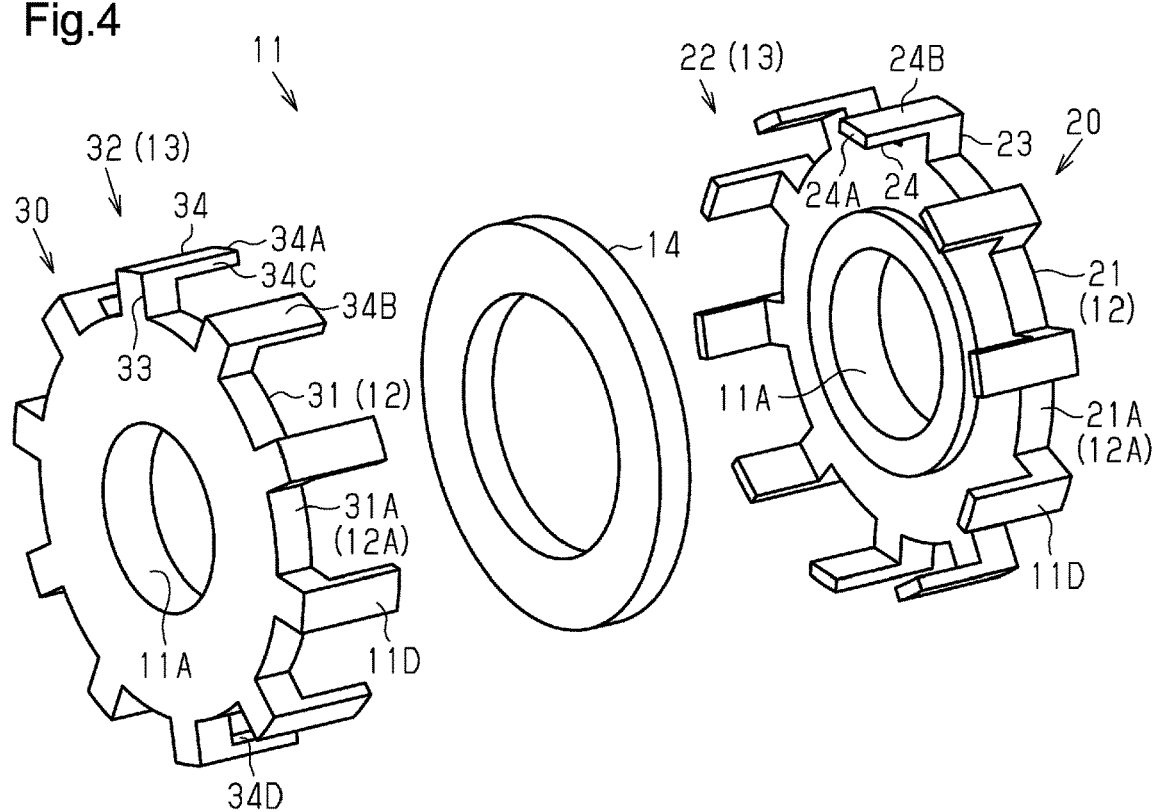
FIG. 4 is an exploded perspective view showing one of the stator iron cores in FIG. 3.

The structure of each stator iron core 11 will now be described with reference to FIG. 4.

The stator iron core 11 includes a circular back yoke 12 and stator claw magnetic poles 13 that protrude from the back yoke 12 in the radial direction of the rotor 50 (hereinafter referred to as the radial direction). The back yoke 12 of the present embodiment is annular. The through-hole 11A of the stator iron core 11 is formed in the back yoke 12. In other words, the back yoke 12 includes the through-hole 11A. The stator claw magnetic poles 13 protrude in the radial direction from an outer circumferential surface 12A of the back yoke 12 and extends in the axial direction.

The stator iron core 11 includes a first stator 20 and a second stator 30. The first stator 20 includes a circular first back yoke 21 and first stator claw magnetic poles 22 that protrude from the first back yoke 21 in the radial direction. The first back yoke 21 of the present embodiment is annular. The first back yoke 21 is included in the back yoke 12. The first stator claw magnetic poles 22 protrude from the first back yoke 21 in the radial direction and extend at least toward the second stator 30 in the axial direction. For example. the first stator claw magnetic poles 22 protrude from the outer circumferential surface 21A of the first back yoke 21 in the radial direction and extend toward the second stator 30 in the axial direction. The first stator claw magnetic poles 22 are included in the stator claw magnetic poles 13. The number of the first stator claw magnetic poles 22 is, for example, ten. The first stator claw magnetic poles 22 are arranged, for example, at equal intervals in the circumferential direction on the outer circumferential surface 21A of the first back yoke 21.

Each first stator claw magnetic pole 22 includes a first claw magnetic pole 23 and a second claw magnetic pole 24. The first claw magnetic pole 23 is a portion including the root of the first stator claw magnetic pole 22. The first claw magnetic pole 23 extends in the radial direction from the outer circumferential surface 21A of the first back yoke 21. The second claw magnetic pole 24 is a portion including a tip 24A of the first stator claw magnetic pole 22. The second claw magnetic pole 24 extends from the first claw magnetic pole 23 toward the second stator 30. The second claw magnetic pole 24 has, for example, a parallelepiped shape. For example, an outer surface 24B of each second claw magnetic pole 24, which is a part of the outer circumferential surface 11D of the stator iron core 11, opposes the corresponding magnet 52 of the rotor 50.

The second stator 30 has, for example, the substantially same structure as the first stator 20. The second stator 30 includes a circular second back yoke 31 and second stator claw magnetic poles 32 that protrude from the second back yoke 31 in the radial direction. The second back yoke 31 of the present embodiment is annular. The second back yoke 31 is included in the back yoke 12. Each second stator claw magnetic pole 32 protrudes from the second back yoke 31 in the radial direction, and extends at least toward the first stator 20 in the axial direction such that a void G (refer to FIG. 3) is created between the first stator claw magnetic pole 22 and the second stator claw magnetic pole 32 in the circumferential direction. For example, the second stator claw magnetic poles 32 protrude from the outer circumferential surface 31A of the second back yoke 31 in the radial direction and extend toward the first stator 20 in the axial direction. The second stator claw magnetic poles 32 are included in the stator claw magnetic poles 13. The number of the second stator claw magnetic poles 32 is, for example, ten. The second stator claw magnetic poles 32 are arranged, for example, at equal intervals in the circumferential direction on the outer circumferential surface 31A of the second back yoke 31.

Each second stator claw magnetic pole 32 includes a first claw magnetic pole 33 and a second claw magnetic pole 34. The first claw magnetic pole 33 is a portion including the root of the second stator claw magnetic pole 32. The first claw magnetic pole 33 extends in the radial direction from the outer circumferential surface 31A of the second back yoke 31. The second claw magnetic pole 34 is a portion including a tip 34A of the second stator claw magnetic pole 32. The second claw magnetic pole 34 extends from the first claw magnetic pole 33 toward the first stator 20 such that the void G is created between the second claw magnetic pole 34 and the second claw magnetic pole 24 of the first stator claw magnetic pole 22 in the circumferential direction. The second claw magnetic pole 34 has, for example, a parallelepiped shape. For example, an outer surface 34B of each second claw magnetic pole 34, which is a part of the outer circumferential surface 11D of the stator iron core 11, opposes the corresponding magnet 52 of the rotor 50.

The stator 10 further includes a coil 14 wound around in an annular manner. The coil 14 is connected to, for example, an inverter circuit or a current conversion circuit (not shown). The coil 14 is arranged between the first stator 20 and the second stator 30 in the axial direction. For example, the coil 14 is arranged between the first stator 20 and the second stator 30 in the circumferential direction, and the stator iron core 11 is formed by coupling the first stator 20 to the second stator 30 so as to create the void G between each first stator claw magnetic pole 22 and the corresponding second stator claw magnetic pole 32. In the present embodiment, the positional relationship between the first stator 20 and the second stator 30 is determined by the interphase insulating member 40, and the first stator 20 is coupled to the second stator 30 by the fixing member 60.

The structure of each interphase insulating member 40 will now be described with reference to FIGS. 5 to 7.

Figure 5:
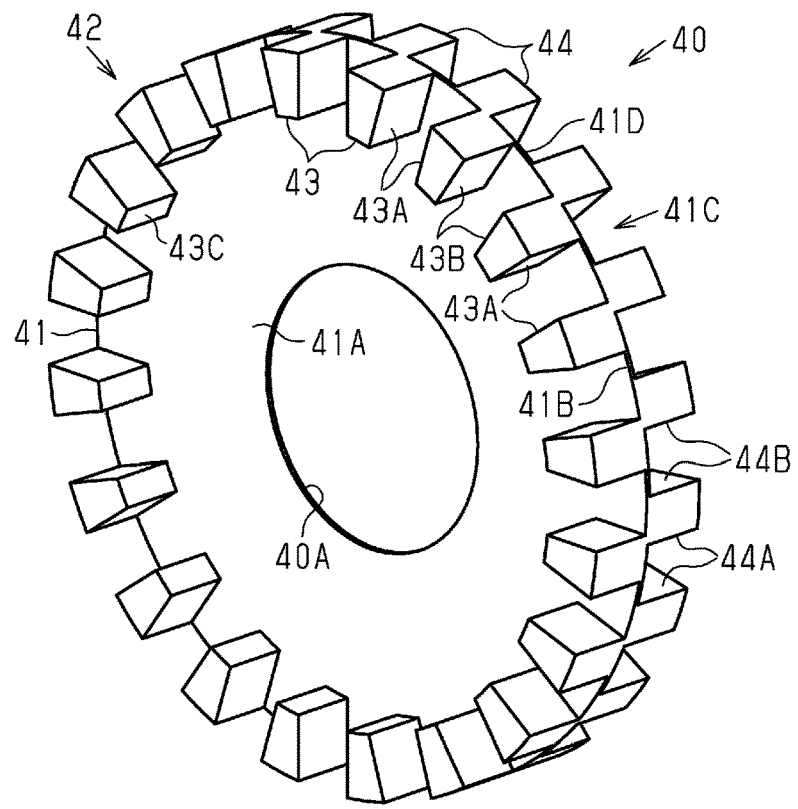
FIG. 5 is a perspective view showing one of the interphase insulating members in FIG. 3.

As shown in FIG. 5, the interphase insulating member 40 includes an insulating portion 41, arranged between adjacent ones of the stator iron cores 11, and supports 42. The insulating portion 41 is, for example, annular. The insulating portion 41 has a sheet shape, a hollow shape, or a mesh shape. The insulating portion 41 of the present embodiment has a sheet shape. The supports 42 are arranged on the insulating portion 41 such that the supports 42 are in contact with the stator claw magnetic poles 13 of the stator iron core 11. For example, the supports 42 are arranged on the insulating portion 41 such that the supports 42 extend in at least one of the axial direction and the radial direction. The stator claw magnetic poles 13 are in contact with the supports 42 in at least one of the circumferential direction and the radial direction. In the present embodiment, the stator claw magnetic poles 13 are in contact with the supports 42 in the circumferential direction (refer to FIG. 2). More specifically, the supports 42 are in contact with, in the circumferential direction, the first stator claw magnetic poles 22 and the second stator claw magnetic poles 32 of the stator iron cores 11 adjacent to the insulating portion 41.

Each support 42 includes a first support 43 extending in the axial direction from a first surface 41A of the insulating portion 41 in the axial direction and a second support 44 extending in the axial direction from a second surface 41C on a side opposite from the first surface 41A of the insulating portion 41. Each first support 43 is located at a position that differs from the position of the corresponding second support 44 in the circumferential direction. The deviations between the first supports 43 and the second supports 44 in the circumferential direction are set in reference to the positions of the stator iron cores 11 of the respective phases in the circumferential direction. The stator iron core 11 in contact with the first supports 43 and the stator iron core 11 in contact with the second supports 44 are the stator iron cores 11 of the phases adjacent to each other in the axial direction.

The first supports 43 are arranged on an edge 41B of the first surface 41A of the insulating portion 41. The number of the first supports 43 is, for example, twenty. The first supports 43 are laid out, for example, at equal intervals in the circumferential direction on the edge 41B of the first surface 41A of the insulating portion 41. The first supports 43 are, for example, columnar. For example, the first supports 43 have the shape of a substantially quadrilateral column that tapers toward the rotation axis RA of the rotor 50 in the radial direction.

Each first support 43 is in contact with the corresponding stator claw magnetic pole 22, 32 of one of the first stator 20 and the second stator 30 on one side surface 43A (hereinafter referred to as the first side surface 43A) in the circumferential direction. Each first support 43 is in contact with the corresponding stator claw magnetic pole 22, 32 of the other one of the first stator 20 and the second stator 30 on the other side surface 43B (hereinafter referred to as the second side surface 43B) in the circumferential direction. In the first supports 43 adjacent to each other in the circumferential direction, the relationship between the side surfaces 43A, 43B in the circumferential direction is reverse. In other words, in the first supports 43 adjacent to each other in the circumferential direction, the first side surfaces 43A or the second side surfaces 43B oppose each other.

Figure 6:
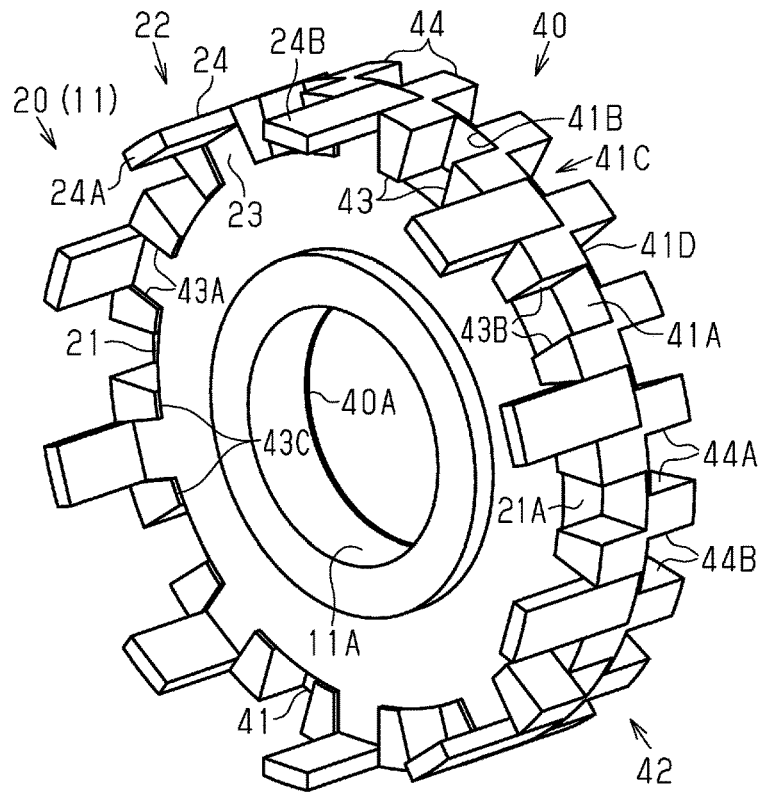
FIG. 6 is a perspective view showing the relationship between the interphase insulating member in FIG. 5 and the first stator.

As shown in FIG. 6, the first side surfaces 43A of the first supports 43 are in contact with a first stator claw magnetic pole 22 of the first stator 20 in the circumferential direction. For example, the first stator claw magnetic pole 22 is held between the first side surfaces 43A of the first supports 43 that oppose each other in the circumferential direction. Thus, the first stator 20 is positioned in the circumferential direction through the contact between the first stator claw magnetic pole 22 and the first side surfaces 43A of the first supports 43.

Each first support 43 includes a side surface 43C closer to the rotation axis RA in the radial direction (hereinafter referred to as the third side surface 43C). The third side surface 43C is in contact with the first back yoke 21 of the first stator 20. For example, the third side surfaces 43C of the first supports 43 are in contact with the outer circumferential surface 21A of the first back yoke 21 in the radial direction. Thus, the first stator 20 is positioned in the radial direction through the contact between the first back yoke 21 and the first side surfaces 43C of the first supports 43.

Figure 7:
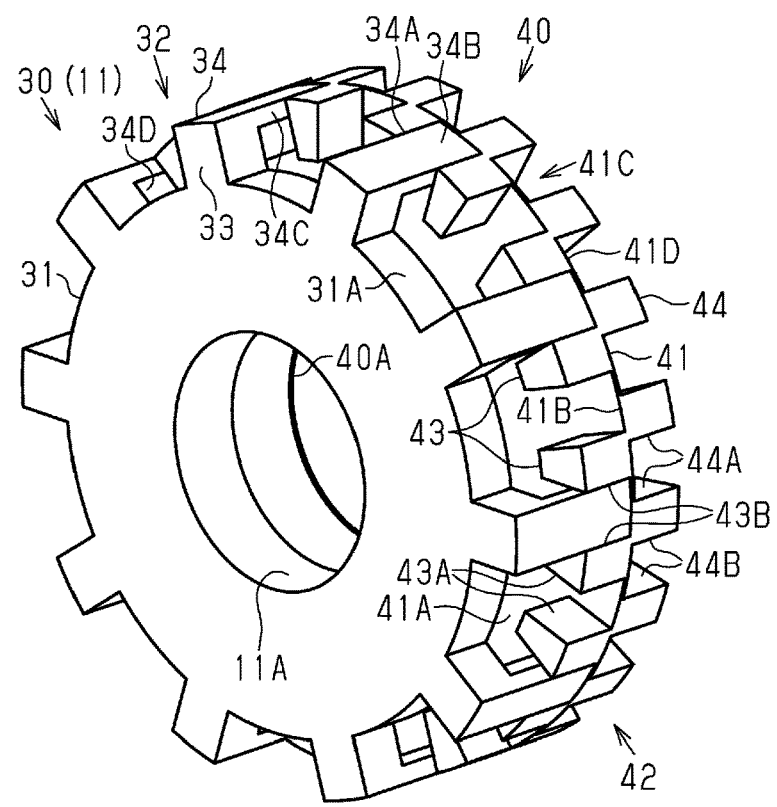
FIG. 7 is a perspective view showing the relationship between the interphase insulating member in FIG. 5 and the second stator.

As shown in FIG. 7, the second side surfaces 43B of the first supports 43 are in contact with a second stator claw magnetic pole 32 of the second stator 30 in the circumferential direction. More specifically, the second side surfaces 43B of the first supports 43 are in contact with the tip 34A of the second stator claw magnetic pole 32 in the circumferential direction. In the example shown in FIG. 7, the second side surfaces 43B of the first supports 43 are in contact with a side surface 34C of the second claw magnetic pole 34 including the tip 34A of the second stator claw magnetic pole 32. For example, the tip 34A of the second stator claw magnetic pole 32 is held between the second side surfaces 43B of the first supports 43 that oppose each other in the circumferential direction. Thus, the second stator 30 is positioned in the circumferential direction through the contact between the second stator claw magnetic pole 32 and the second side surfaces 43B of the first supports 43.

The second supports 44 are arranged on an edge 41D of the second surface 41C of the insulating portion 41. The number of the second supports 44 is, for example, twenty. The second supports 44 are laid out, for example, at equal intervals in the circumferential direction on the edge 41D of the second surface 41C of the insulating portion 41. The shapes of the second supports 44 are substantially the same as the shapes of the first supports 43.

Each second support 44 is in contact with the corresponding stator claw magnetic pole 22, 32 of one of the first stator 20 and the second stator 30 on one side surface 44A (hereinafter referred to as the first side surface 44A) in the circumferential direction. Each second support 44 is in contact with the corresponding stator claw magnetic pole 22, 32 of the other one of the first stator 20 and the second stator 30 on the other side surface 44B (hereinafter referred to as the second side surface 44B) in the circumferential direction. In the second supports 44 adjacent to each other in the circumferential direction, the relationship between the side surfaces 44A, 44B in the circumferential direction is reverse. In other words, in the second supports 44 adjacent to each other in the circumferential direction, the first side surfaces 44A or the second side surfaces 44B oppose each other.

The first side surfaces 44A of the second supports 44 are in contact with a second stator claw magnetic pole 32 of the second stator 30 in the circumferential direction. The relationship between the first side surfaces 44A of the second supports 44 and the second stator claw magnetic pole 32 is substantially the same as the relationship between the first side surfaces 43A of the first supports 43 and the first stator claw magnetic pole 22. Thus, the second stator 30 is positioned in the circumferential direction through the contact between the second stator claw magnetic pole 32 and the first side surfaces 44A of the second supports 44.

Each second support 44 includes a side surface closer to the rotation axis RA in the radial direction (hereinafter referred to as the third side surface). The third side surface is in contact with the second back yoke 31 of the second stator 30. The relationship between the third side surface of each second support 44 is substantially the same as the relationship between the third side surface 43C of the corresponding first support 43 and the first back yoke 21. Thus, the second stator 30 is positioned in the radial direction through the contact between the second back yoke 31 and the third side surfaces of the second supports 44.

The second side surfaces 44B of the second supports 44 are in contact with a first stator claw magnetic pole 22 of the first stator 20 in the circumferential direction. The relationship between the second side surfaces 44A of the second supports 44 and the first stator claw magnetic pole 22 is substantially the same as the relationship between the second side surfaces 43B of the first supports 43 and the second stator claw magnetic pole 32. Thus, the first stator 20 is positioned in the circumferential direction through the contact between the first stator claw magnetic pole 22 and the second side surfaces 44B of the second supports 44. Accordingly, in the stator iron cores 11 adjacent to each other in the axial direction, one of the stator iron cores 11 is positioned by the first supports 43 and the other one of the stator iron cores 11 is positioned by the second supports 44.

The insulating portion 41 of the interphase insulating member 40 is in contact with, in the axial direction, the tips 24A, 34A of one of the stator claw magnetic poles 22, 32 extending toward the insulating portion 41 in the first stator claw magnetic poles 22 and the second stator claw magnetic poles 32 of the stator iron core 11 adjacent to the insulating portion 41. For example, the first surface 41A of the insulating portion 41 is in contact with the tips 34A of the second stator claw magnetic poles 32 in the axial direction, and the second surface 41C of the insulating portion 41 is in contact with the tips 24A of the first stator claw magnetic poles 22 in the axial direction. The insulating portion 41 does not have to be in contact with, in the axial direction, the tips 24A, 34A of one of the stator claw magnetic poles 22, 32 extending toward the insulating portion 41 in the first stator claw magnetic poles 22 and the second stator claw magnetic poles 32 of the stator iron core 11 adjacent to the insulating portion 41.

Figure 8:
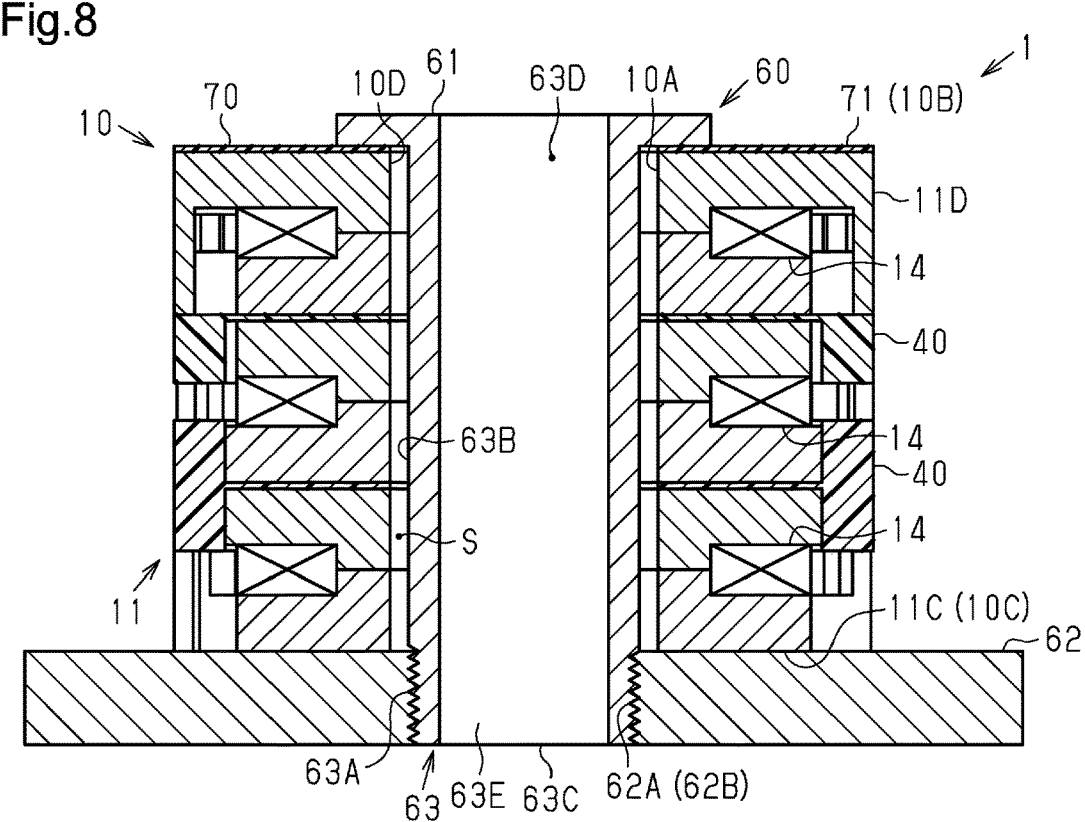
FIG. 8 is a cross-sectional view taken along the axial direction of the rotor in the motor in FIG. 2.

As shown in FIG. 8, the rod portion 63 has a specific length in the axial direction. The length of the rod portion 63 in the axial direction is set to be longer than the thickness of the stator 10 in the axial direction. The length of the rod portion 63 in the axial direction is preferably set to be less than or equal to the sum of the thickness of the stator 10 in the axial direction and the thickness of the second end plate 62 in the axial direction. In the present embodiment, the length of the rod portion 63 in the axial direction is set so as to coincide with the sum of the thickness of the stator 10 in the axial direction and the thickness of the second end plate 62 in the axial direction. The length of the rod portion 63 in the axial direction may be set to be greater than the sum of the thickness of the stator 10 in the axial direction and the thickness of the second end plate 62 in the axial direction.

The outer diameter of the rod portion 63 is smaller than the inner diameter of the through-hole 10A of the stator 10. For example, the rod portion 63 opposes an inner surface 10D of the through-hole 10A of the stator 10 in the radial direction with a gap S located in between. The gap S includes a space greater than or equal to the engagement tolerance of the rod portion 63 and the through-hole 10A of the stator 10. For example, the gap S is of necessary size to allow the coil 14 to be drawn through.

The stator 10 is formed by combining the interphase insulating members 40 and the insulating member 70 with the stator iron cores 11 of the respective phases such that the stator iron cores 11 of the phases are positioned by the interphase insulating members 40 and the insulating member 70. Further, the stator 10 is formed by inserting the rod portion 63 into the through-hole 10A of the stator 10 such that the thread groove 63A of the rod portion 63 is fastened to the thread groove 62A of the second end plate 62. In the motor 1, the stator 10 is fixed using the fixing member 60 in a favorable manner with the stator iron cores 11 positioned relative to each other.

The present embodiment provides the following advantages.

(1-1) In the stator 10, the stator claw magnetic poles 13 are in contact with the supports 42 in the circumferential direction. In this structure, each stator iron core 11 is positioned through the contact between the stator claw magnetic poles 13 and the supports 42 in the circumferential direction. This allows the stator iron cores 11 to be positioned relative to each other without complicating the structures of the stator iron cores 11.

(1-2) Each first support 43 is located at a position that differs from the position of the corresponding second support 44 in the circumferential direction. In this structure, one of the stator iron cores 11 adjacent to the interphase insulating member 40 is positioned through the contact between the stator claw magnetic poles 13 and the first supports 43, and the other one of the stator iron cores 11 adjacent to the interphase insulating member 40 is positioned through the contact between the stator claw magnetic poles 13 and the second supports 44. This allows the stator iron cores 11 to be positioned relative to each other with the positions of the stator iron cores 11 located at different positions in the circumferential direction.

(1-3) The stator iron core 11 is configured such that the first stator claw magnetic poles 22 and the second stator claw magnetic poles 32 are laid out in the circumferential direction. This structure increases the areas of the stator iron cores 11 opposing the rotor 50 and thus contributes to generating torque in a stable manner.

(1-4) The first stator claw magnetic poles 22 and the second stator claw magnetic poles 32 of the stator iron cores 11 adjacent to the insulating portion 41 are in contact with the supports 42 in the circumferential direction. In this structure, in the stator iron cores 11 adjacent to the insulating portion 41, the first stator 20 is positioned in the circumferential direction through the contact between the first stator claw magnetic poles 22 and the supports 42 and the second stator 30 is positioned in the circumferential direction through the contact between the second stator claw magnetic poles 32 and the supports 42. This allows the stator iron cores 11 to be positioned relative to each other in the circumferential direction in a favorable manner. In addition, the first stator 20 and the second stator 30 are positioned in the circumferential direction without complicating the structure of the stator iron core 11.

(1-5) The first surface 41A of the insulating portion 41 is in contact with the tips 34A of the second stator claw magnetic poles 32 in the axial direction, and the second surface 41C of the insulating portion 41 is in contact with the tips 24A of the first stator claw magnetic poles 22 in the axial direction. In this structure, the tips 34A of the second stator claw magnetic poles 32 are supported by the first surface 41A of the insulating portion 41 and the tips 24A of the first stator claw magnetic poles 22 are supported by the second surface 41C of the insulating portion 41 so as to reinforce the stator claw magnetic poles 22, 32. This improves the strength of the stator iron core 11.

(1-6) The rod portion 63 and the first and second end plates 61, 62 are fixed with the rod portion 63 inserted into the through-hole 10A of the stator 10 and the stator 10 held between the first end plate 61 and the second end plate 62 in the axial direction. In this structure, the rod portion 63 inserted into the through-hole 10A of the stator 10 and the first and second end plates 61, 62 are fixed. Thus, the stator 10 is fixed so as to be held between the first end plate 61 and the second end plate 62. This limits the action of a force in the radial direction on the stator 10 during manufacturing. Accordingly, the stator 10 is fixed using the fixing member 60 in a stable manner.

(1-7) The rod portion 63 of the present embodiment is formed integrally with the first end plate 61. In this structure, some of the components of the fixing member 60 are integrally formed. This reduces the number of the components of the fixing member 60.

(1-8) The rod portion 63 is inserted into the through-hole 10A of the stator 10 such that the thread groove 63A of the rod portion 63 is fastened to the thread groove 62A of the second end plate 62. This allows the stator 10 to be fixed with a simple structure.

(1-9) The rod portion 63 opposes the inner surface 10D of the through-hole 10A of the stator 10 in the radial direction with the gap S located in between. In this structure, the rod portion 63 inserted into the through-hole 10A of the stator 10 is not in contact with the inner surface 10D of the through-hole 10A. This limits a force in the radial direction on the stator 10. Accordingly, the stator 10 is fixed using the fixing member 60 in a stable manner.

(1-10) The stator iron cores 11 are each formed using a powder magnetic core. This structure prevents the generation of eddy currents and thus contributes to reducing eddy-current losses. Additionally, the degree of freedom in the shape of the stator iron core 11 improves.

Second Embodiment

The motor 1 according to a second embodiment will now be described with reference to FIGS. 9 to 12. The motor 1 of the present embodiment differs from the motor 1 of the first embodiment in the structure of the interphase insulating member. In the following description, to facilitate understanding, like or the same reference numerals are given to those components that have the same functions as the corresponding components of the motor 1 according to the first embodiment. The functions of the components will not be described. The motor 1 shown in FIG. 9 does not include the rotor 50.

Figure 9:
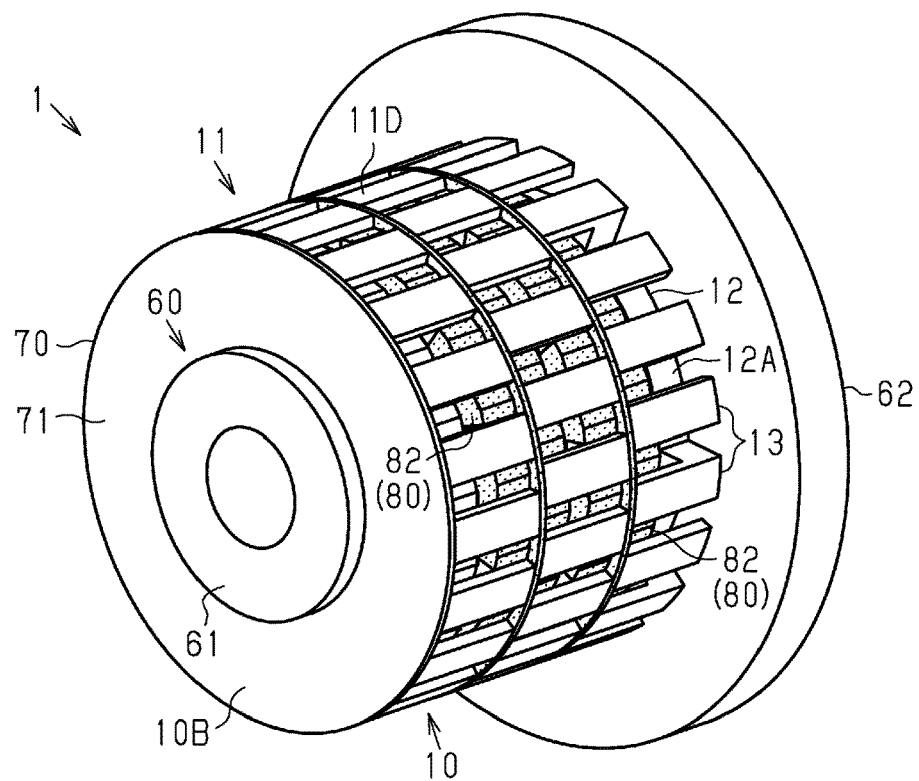
FIG. 9 is a perspective view showing a motor according to a second embodiment.

As shown in FIG. 9, the stator 10 includes the stator iron cores 11 stacked in the axial direction and interphase insulating members 80 each arranged between the corresponding stator iron cores 11. Each interphase insulating member 80 is non-magnetic. The interphase insulating member 80 is made of, for example, plastic. Each interphase insulating member 80 is arranged between the stator iron cores 11 adjacent to each other in the axial direction such that one of the stator iron cores 11 is insulated from the other one of the stator iron cores 11. The number of the interphase insulating members 80 is determined by the number of the stator iron cores 11. For example, the number of the interphase insulating members 80 is two. The dotted parts in FIG. 9 illustrate the interphase insulating members 80. The insulating member 70 of the present embodiment may have the shape of one of the two pieces into which the interphase insulating member 80 is split along a plane that is orthogonal to the axial direction. Alternatively, the insulating member 70 may have the substantially same shape as the interphase insulating member 80 and may have the shape of a flat plate.

Figure 10:
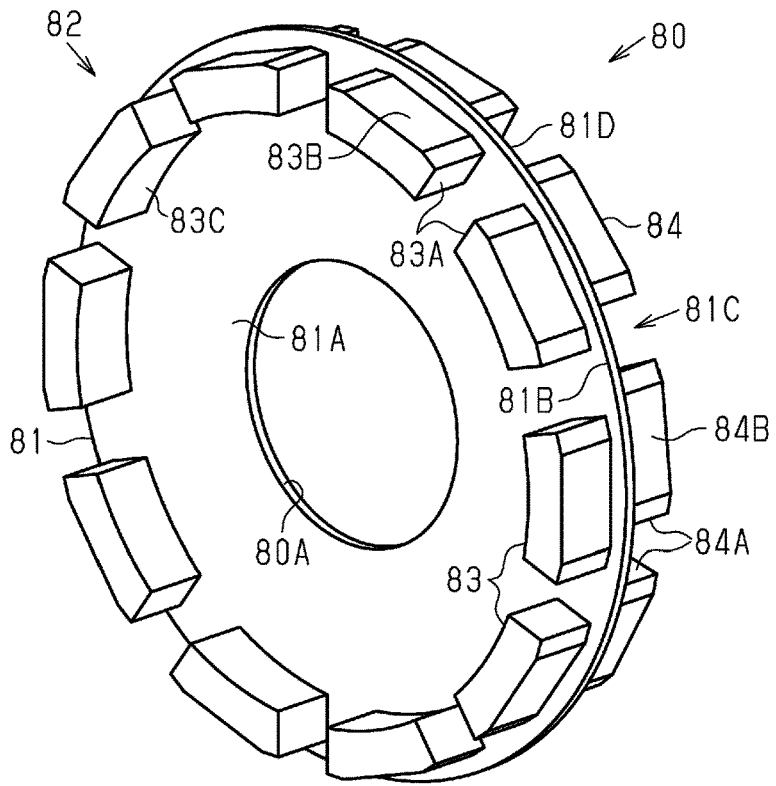
FIG. 10 is a perspective view showing one of the interphase insulating members in FIG. 9.

As shown in FIG. 10, the interphase insulating member 80 includes a through-hole 80A extending through in the axial direction. The through-hole 80A forms a part of the through-hole 10A of the stator 10. The interphase insulating member 80 includes an insulating portion 81 arranged between adjacent ones of the stator iron cores 11 and supports 82. The shape of the insulating portion 81 is substantially the same as the shape of the insulating portion 41 of the first embodiment. The supports 82 are arranged on the insulating portion 81 such that the supports 82 are in contact with the stator claw magnetic poles 13 of the stator iron core 11. For example, the supports 82 are arranged on the insulating portion 81 such that the supports 82 in at least one of the axial direction and the radial direction. The stator claw magnetic poles 13 are in contact with the supports 82 in at least one of the circumferential direction and the radial direction. In the present embodiment, the stator claw magnetic poles 13 are in contact with the supports 82 in the circumferential direction and the radial direction (refer to FIG. 9). More specifically, the supports 82 are in contact with one of the first stator claw magnetic poles 22 and the second stator claw magnetic poles 32 of the stator iron cores 11 adjacent to the insulating portion 81 in the circumferential direction and are in contact with the other one of the first stator claw magnetic poles 22 and the second stator claw magnetic poles 32 in the radial direction.

Each support 82 includes a first support 83 extending in the axial direction from a first surface 81A of the insulating portion 81 in the axial direction and a second support 84 extending in the axial direction from a second surface 81C on a side opposite from the first surface 81A of the insulating portion 81. The first support 83 is located at a position that differs from the position of the second support 84 in the circumferential direction. The deviations between the first supports 83 and the second supports 84 in the circumferential direction are set in reference to the positions of the stator iron cores 11 of the respective phases in the circumferential direction. The stator iron core 11 in contact with the first support 83 and the stator iron core 11 in contact with the second support 84 are the stator iron cores 11 of the phases adjacent to each other in the axial direction.

The first supports 83 are arranged in the vicinity of an edge 81B of the first surface 81A of the insulating portion 81. For example, the first supports 83 are arranged on the first surface 81A such that a specific gap is formed between the first supports 83 and the edge 81B of the first surface 81A in the radial direction. The specific gap includes a space in which the tips 24A, 34A of the stator claw magnetic poles 22, 32 can be arranged. The number of the first supports 83 is, for example, ten. The first supports 83 are laid out, for example, at equal intervals in the circumferential direction in the vicinity of the edge 81B of the first surface 81A of the insulating portion 81. The first supports 83 are configured to extend in the circumferential direction. The first supports 83 are, for example, columnar. For example, the first supports 83 have the shape of a substantially quadrilateral column that tapers toward the rotation axis RA of the rotor 50 in the radial direction.

Each first support 83 is in contact with the corresponding stator claw magnetic pole 22, 32 of one of the first stator 20 and the second stator 30 on one side surface 83A (hereinafter referred to as the first side surface 83A) in the circumferential direction. Each first support 83 is in contact with the corresponding stator claw magnetic pole 22, 32 of the other one of the first stator 20 and the second stator 30 on one side surface 83B on a side opposite from the side surface 83C that is closer to the rotation axis RA in the radial direction (hereinafter referred to as the second side surface 83B).

Figure 11:
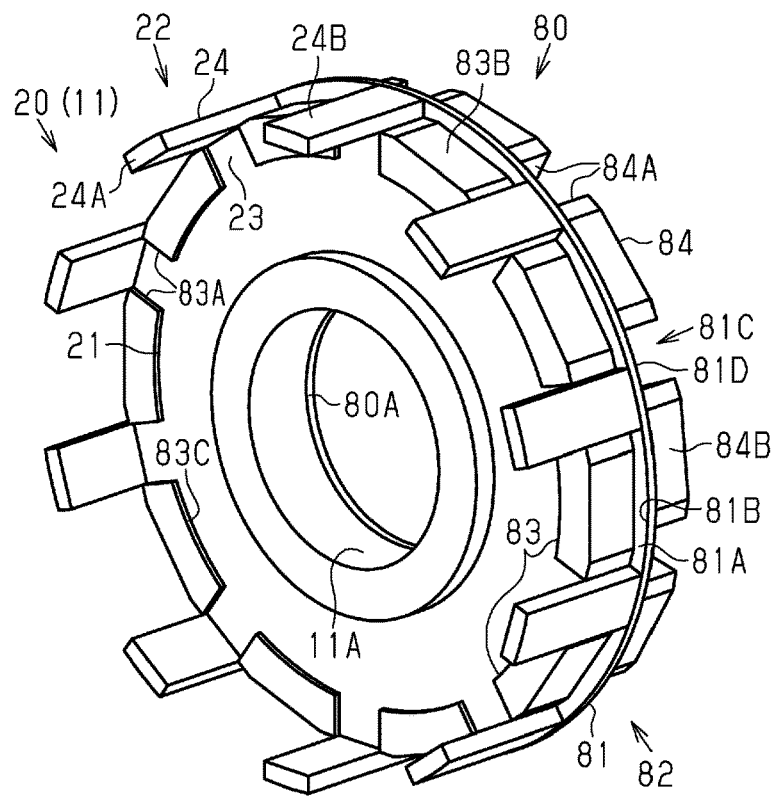
FIG. 11 is a perspective view showing the relationship between the interphase insulating member in FIG. 10 and the first stator.

As shown in FIG. 11, the first side surfaces 83A of the first supports 83 are in contact with a first stator claw magnetic pole 22 of the first stator 20 in the circumferential direction. More specifically, the first side surfaces 83A of the first supports 83 are in contact with the first claw magnetic pole 23 of the first stator claw magnetic pole 22 in the circumferential direction. For example, the first claw magnetic pole 23 of the first stator claw magnetic pole 22 is held between the first side surfaces 83A of the first supports 83 that oppose each other in the circumferential direction. Thus, the first stator 20 is positioned in the circumferential direction through the contact between the first stator claw magnetic pole 22 and the first side surfaces 83A of the first supports 83.

Each first support 83 includes a side surface 83C closer to the rotation axis RA in the radial direction (hereinafter referred to as the third side surface 83C). The third side surface 83C is in contact with the first back yoke 21 of the first stator 20. For example, the third side surfaces 83C of the first supports 83 are in contact with the outer circumferential surface 21A of the first back yoke 21 in the radial direction. Thus, the first stator 20 is positioned in the radial direction through the contact between the first back yoke 21 and the first side surfaces 83C of the first supports 83.

Figure 12:
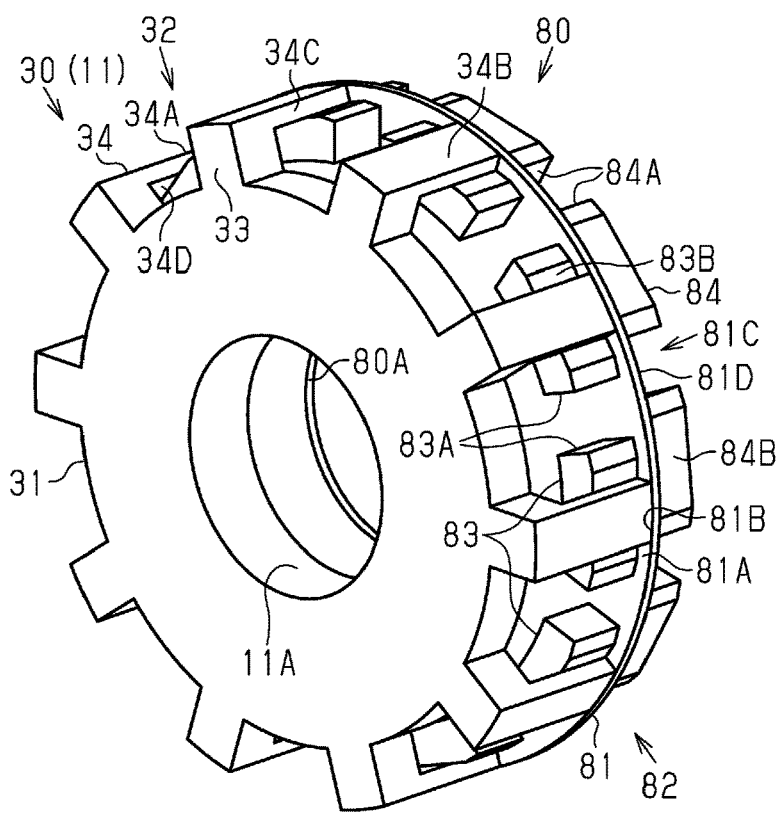
FIG. 12 is a perspective view showing the relationship between the interphase insulating member in FIG. 10 and the second stator.

As shown in FIG. 12, the second side surface 83B of each first support 83 is in contact with the corresponding second stator claw magnetic pole 32 of the second stator 30 in the radial direction. More specifically, the second side surface 83B of the first support 83 is in contact with the tip 34A of the second stator claw magnetic pole 32 in the radial direction. In the example shown in FIG. 12, the second side surface 83B of the first support 83 is in contact with an inner surface 34D of the second claw magnetic pole 34 including the tip 34A of the second stator claw magnetic pole 32 in the radial direction. The inner surface 34D of the second claw magnetic pole 34 faces the rotation axis RA in the radial direction. For example, the tip 34A of the second stator claw magnetic pole 32 is arranged in the above-described specific gap such that the tip 34A is in contact with the second side surface 83B of the first support 83. Thus, the second stator 30 is positioned in the radial direction through the contact between the second stator claw magnetic pole 32 and the second side surface 83B of the first support 83.

The second supports 84 are arranged in the vicinity of an edge 81D of the second surface 81C of the insulating portion 81. For example, the second supports 84 are arranged on the second surface 81C such that a specific gap is formed between the second supports 84 and the edge 81D of the second surface 81C in the radial direction. The number of the second supports 84 is, for example, ten. The second supports 84 are laid out, for example, at equal intervals in the circumferential direction in the vicinity of the edge 81D of the second surface 81C of the insulating portion 81. The shapes of the second supports 84 are substantially the same as the shapes of the first supports 83.

Each second support 84 is in contact with the corresponding stator claw magnetic pole 22, 32 of one of the first stator 20 and the second stator 30 on one side surface 84A (hereinafter referred to as the first side surface 84A) in the circumferential direction. Each second support 84 is in contact with the corresponding stator claw magnetic pole 22, 32 of the other one of the first stator 20 and the second stator 30 on one side surface 84B on a side opposite from the side surface that is closer to the rotation axis RA in the radial direction (hereinafter referred to as the second side surface 84B).

The first side surfaces 84A of the second supports 84 are in contact with a second stator claw magnetic pole 32 of the second stator 30 in the circumferential direction. The relationship between the first side surfaces 84A of the second supports 84 and the second stator claw magnetic pole 32 is substantially the same as the relationship between the first side surfaces 83A of the first supports 83 and the first stator claw magnetic pole 22. Thus, the second stator 30 is positioned in the circumferential direction through the contact between the second stator claw magnetic pole 32 and the first side surfaces 84A of the second supports 84.

Each second support 84 includes a side surface closer to the rotation axis RA in the radial direction (hereinafter referred to as the third side surface). The third side surface is in contact with the second back yoke 31 of the second stator 30. The relationship between the third side surface of the second support 84 is substantially the same as the relationship between the third side surface 83C of the first support 83 and the first back yoke 21. Thus, the second stator 30 is positioned in the radial direction through the contact between the second back yoke 31 and the third side surfaces of the second supports 84.

The second side surface 84B of each second support 84 is in contact with the corresponding first stator claw magnetic pole 22 of the first stator 20 in the radial direction. The relationship between the second side surface 84A of the second support 84 and the first stator claw magnetic pole 22 is substantially the same as the relationship between the second side surface 83B of the first support 83 and the second stator claw magnetic pole 32. Thus, the first stator 20 is positioned in the radial direction through the contact between the first stator claw magnetic poles 22 and the second side surfaces 84B of the second supports 84. Accordingly, in the stator iron cores 11 adjacent to each other in the axial direction, one of the stator iron cores 11 is positioned by the first supports 83 and the other one of the stator iron cores 11 is positioned by the second supports 84.

The insulating portion 81 of the interphase insulating member 80 is in contact with, in the axial direction, the tips 24A, 34A of one of the stator claw magnetic poles 22, 32 extending toward the insulating portion 81 in the first stator claw magnetic poles 22 and the second stator claw magnetic poles 32 of the stator iron core 11 adjacent to the insulating portion 81. For example, the first surface 81A of the insulating portion 81 is in contact with the tips 34A of the second stator claw magnetic poles 32 in the axial direction, and the second surface 81C of the insulating portion 41 is in contact with the tips 24A of the first stator claw magnetic poles 22 in the axial direction. The insulating portion 81 does not have to be in contact with, in the axial direction, the tips 24A, 34A of one of the stator claw magnetic poles 22, 32 extending toward the insulating portion 81 in the first stator claw magnetic poles 22 and the second stator claw magnetic poles 32 of the stator iron core 11 adjacent to the insulating portion 81.

In addition to advantages (1-1) to (1-10) of the first embodiment, the present embodiment provides the following advantage.

(2-1) The supports 82 are in contact with one of the first stator claw magnetic poles 22 and the second stator claw magnetic poles 32 of the stator iron cores 11 adjacent to the insulating portion 81 in the circumferential direction and are in contact with the other one of the first stator claw magnetic poles 22 and the second stator claw magnetic poles 32 in the radial direction. In this structure, in the stator iron cores 11 adjacent to the insulating portion 81, the first stator 20 is positioned in one of the circumferential direction and the radial direction through the contact between the first stator claw magnetic poles 22 and the supports 82 and the second stator 30 is positioned in the other one of the circumferential direction and the radial direction through the contact between the second stator claw magnetic poles 32 and the supports 82. This allows the stator iron cores 11 to be positioned relative to each other in the circumferential direction and the radial direction in a favorable manner. In addition, the first stator 20 and the second stator 30 are positioned in the circumferential direction and the radial direction without complicating the structure of the stator iron core 11.

Third Embodiment

The motor 1 according to a third embodiment will now be described with reference to FIGS. 13 to 16. The motor 1 of the present embodiment differs from the motor 1 of the first embodiment in the structure of the interphase insulating member. In the following description, to facilitate understanding, like or the same reference numerals are given to those components that have the same functions as the corresponding components of the motor 1 according to the first embodiment. The functions of the components will not be described. The motor 1 shown in FIG. 13 does not include the rotor 50.

Figure 13:
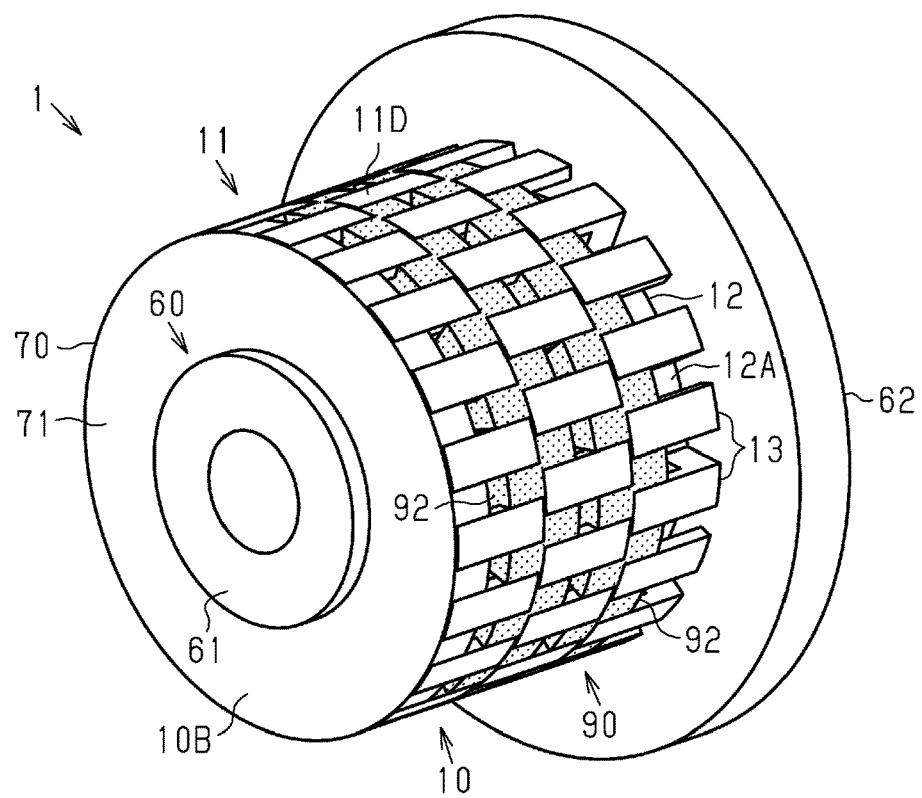
FIG. 13 is a perspective view showing a motor according to a third embodiment.

As shown in FIG. 13, the stator 10 includes the stator iron cores 11 stacked in the axial direction and interphase insulating members 90 each arranged between the corresponding stator iron cores 11. Each interphase insulating member 90 is non-magnetic. The interphase insulating member 90 is made of, for example, plastic. Each interphase insulating member 90 is arranged between the stator iron cores 11 adjacent to each other in the axial direction such that one of the stator iron cores 11 is insulated from the other one of the stator iron cores 11. The number of the interphase insulating members 90 is determined by the number of the stator iron cores 11. For example, the number of the interphase insulating members 90 is two. The dotted parts in FIG. 13 illustrate the interphase insulating members 90. The insulating member 70 of the present embodiment may have the shape of one of the two pieces into which the interphase insulating member 90 is split along a plane that is orthogonal to the axial direction. Alternatively, the insulating member 70 may have the substantially same shape as the interphase insulating member 90 and may have the shape of a flat plate.

Figure 14:
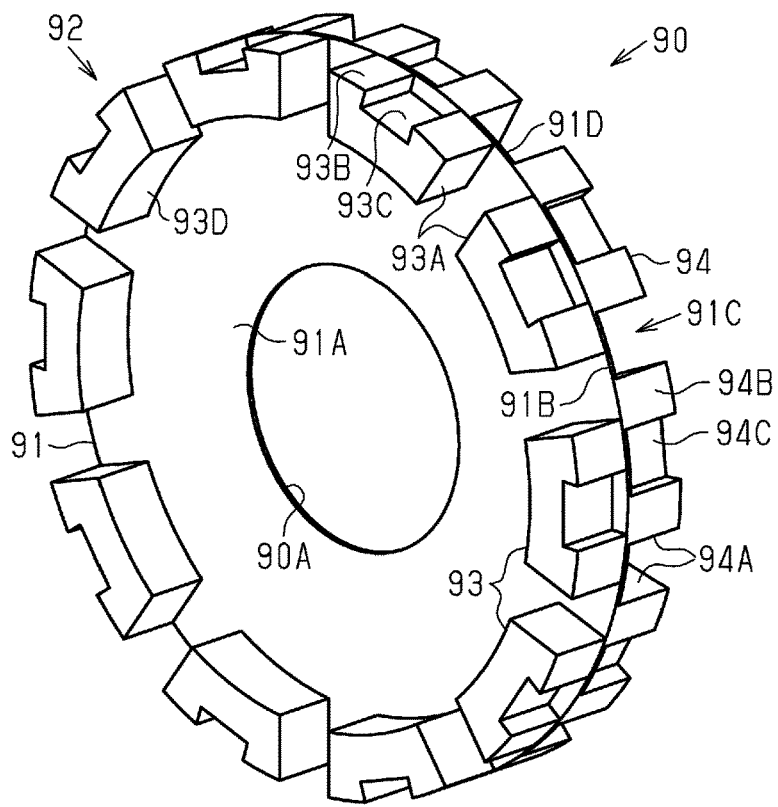
FIG. 14 is a perspective view showing one of the interphase insulating members in FIG. 13.

As shown in FIG. 14, the interphase insulating member 90 includes a through-hole 90A extending through in the axial direction. The through-hole 90A forms a part of the through-hole 10A of the stator 10. The interphase insulating member 90 includes an insulating portion 91 arranged between adjacent ones of the stator iron cores 11 and supports 92. The shape of the insulating portion 91 is substantially the same as the shape of the insulating portion 41 of the first embodiment. The supports 92 are arranged on the insulating portion 91 such that the supports 92 are in contact with the stator claw magnetic poles 13 of the stator iron core 11. For example, the supports 92 are arranged on the insulating portion 91 such that the supports 92 in at least one of the axial direction and the radial direction. The stator claw magnetic poles 13 are in contact with the supports 92 in at least one of the circumferential direction and the radial direction. In the present embodiment, the stator claw magnetic poles 13 are in contact with the supports 92 in the circumferential direction and the radial direction (refer to FIG. 13). More specifically, the supports 92 are in contact with one of the first stator claw magnetic poles 22 and the second stator claw magnetic poles 32 of the stator iron cores 11 adjacent to the insulating portion 91 in the circumferential direction and are in contact with the other one of the first stator claw magnetic poles 22 and the second stator claw magnetic poles 32 in the circumferential direction and the radial direction.

Each support 92 includes a first support 93 extending in the axial direction from a first surface 91A of the insulating portion 91 in the axial direction and a second support 94 extending in the axial direction from a second surface 91C on a side opposite from the first surface 91A of the insulating portion 91. The first support 93 is located at a position that differs from the position of the second support 94 in the circumferential direction. The deviations between the first supports 93 and the second supports 94 in the circumferential direction are set in reference to the positions of the stator iron cores 11 of the respective phases in the circumferential direction. The stator iron core 11 in contact with the first support 93 and the stator iron core 11 in contact with the second support 94 are the stator iron cores 11 of the phases adjacent to each other in the axial direction.

The first supports 93 are arranged on an edge 91B of the first surface 91A of the insulating portion 91. The number of the first supports 93 is, for example, ten. The first supports 93 are laid out, for example, at equal intervals in the circumferential direction on the edge 91B of the first surface 91A of the insulating portion 91. The first supports 93 are, for example, columnar. For example, the first supports 93 have the shape of a substantially quadrilateral column that tapers toward the rotation axis RA of the rotor 50 in the radial direction.

Each first support 93 is in contact with the corresponding stator claw magnetic pole 22, 32 of one of the first stator 20 and the second stator 30 on one side surface 93A (hereinafter referred to as the first side surface 93A) in the circumferential direction. Each first support 93 is in contact with the corresponding stator claw magnetic pole 22, 32 of the other one of the first stator 20 and the second stator 30 on one side surface 93B on a side opposite from a side surface 93D that is closer to the rotation axis RA in the radial direction (hereinafter referred to as the second side surface 93B). More specifically, each first support 93 includes a recess 93C in the corresponding second side surface 93B so that the recess 93C is in contact with the stator claw magnetic pole 22, 32 of the other one of the first stator 20 and the second stator 30. The recess 93C is recessed from the second side surface 93B so as to accommodate the tip 24A, 34A of the stator claw magnetic pole 22, 32.

Figure 15:
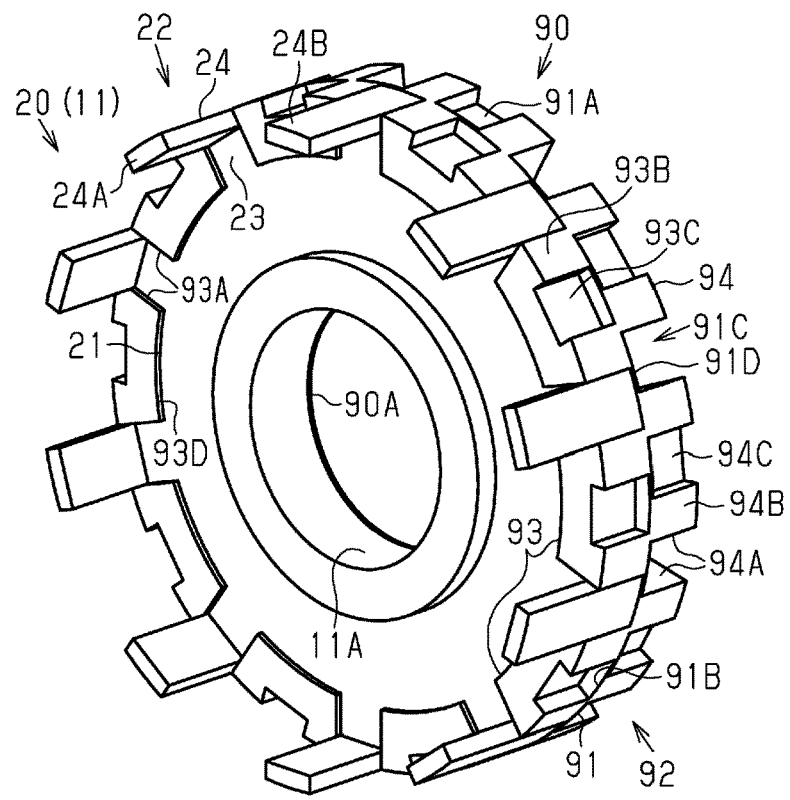
FIG. 15 is a perspective view showing the relationship between the interphase insulating member in FIG. 14 and the first stator.

As shown in FIG. 15, the first side surfaces 93A of the first supports 93 are in contact with a first stator claw magnetic pole 22 of the first stator 20 in the circumferential direction. For example, the first stator claw magnetic pole 22 is held between the first side surfaces 93A of the first supports 93 that oppose each other in the circumferential direction. Thus, the first stator 20 is positioned in the circumferential direction through the contact between the first stator claw magnetic pole 22 and the first side surfaces 93A of the first supports 93.

Each first support 93 includes the corresponding side surface 93D closer to the rotation axis RA in the radial direction (hereinafter referred to as the third side surface 93D). The third side surface 93D is in contact with the first back yoke 21 of the first stator 20. For example, the third side surfaces 93D of the first supports 93 are in contact with the outer circumferential surface 21A of the first back yoke 21 in the radial direction. Thus, the first stator 20 is positioned in the radial direction through the contact between the first back yoke 21 and the first side surfaces 93D of the first supports 93.

Figure 16:
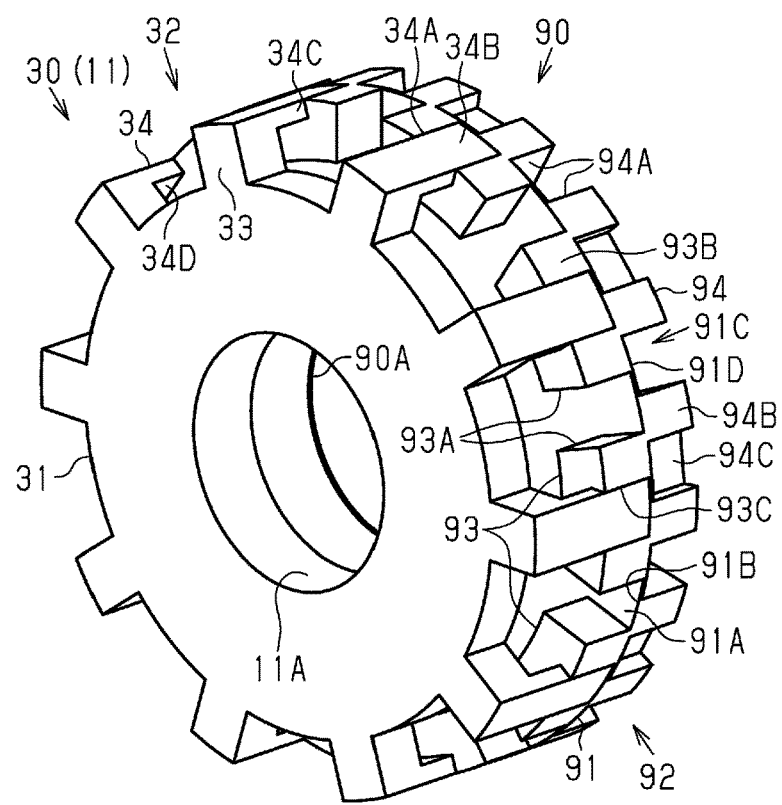
FIG. 16 is a perspective view showing the relationship between the interphase insulating member in FIG. 14 and the second stator.

As shown in FIG. 16, the recess 93C of each first support 93 is in contact with the corresponding second stator claw magnetic pole 32 of the second stator 30 in the circumferential direction and the radial direction. More specifically, the recess 93C of each first support 93 is in contact with the tip 34A of the corresponding second stator claw magnetic pole 32 in the circumferential direction and the radial direction. In the example shown in FIG. 16, the recess 93C of the first support 93 is in contact with the side surface 34C of the second claw magnetic pole 34 including the tip 34A of the second stator claw magnetic pole 32 in the circumferential direction and is in contact with the inner surface 34D of the second claw magnetic pole 34 in the radial direction. For example, the tip 34A of the second stator claw magnetic pole 32 is fitted into the recess 93C of the first support 93. Thus, the second stator 30 is positioned in the circumferential direction and the radial direction through the contact between the second stator claw magnetic pole 32 and the recess 93C of the first support 93.

The second supports 94 are arranged on an edge 91D of the second surface 91C of the insulating portion 91. The number of the second supports 94 is, for example, ten. The second supports 94 are laid out, for example, at equal intervals in the circumferential direction on the edge 91D of the second surface 91C of the insulating portion 91. The shapes of the second supports 94 are substantially the same as the shapes of the first supports 93.

Each second support 94 is in contact with the corresponding stator claw magnetic pole 22, 32 of one of the first stator 20 and the second stator 30 on one side surface 94A (hereinafter referred to as the first side surface 94A) in the circumferential direction. Each second support 94 is in contact with the corresponding stator claw magnetic pole 22, 32 of the other one of the first stator 20 and the second stator 30 on one side surface 94B on a side opposite from the side surface that is closer to the rotation axis RA in the radial direction (hereinafter referred to as the second side surface 94B). More specifically, each second support 94 includes a recess 94C in the corresponding second side surface 94B so that the recess 94C is in contact with the stator claw magnetic pole 22, 32 of the other one of the first stator 20 and the second stator 30. The recess 94C is recessed from the second side surface 94B so as to accommodate the tip 24A, 34A of the stator claw magnetic pole 22, 32.

The first side surfaces 94A of the second supports 94 are in contact with a second stator claw magnetic pole 32 of the second stator 30 in the circumferential direction. The relationship between the first side surfaces 94A of the second supports 94 and the second stator claw magnetic pole 32 is substantially the same as the relationship between the first side surfaces 93A of the first supports 93 and the first stator claw magnetic pole 22. Thus, the second stator 30 is positioned in the circumferential direction through the contact between the second stator claw magnetic pole 32 and the first side surfaces 94A of the second supports 94.

Each second support 94 includes a side surface closer to the rotation axis RA in the radial direction (hereinafter referred to as the third side surface). The third side surface is in contact with the second back yoke 31 of the second stator 30. The relationship between the third side surface of the second support 94 is substantially the same as the relationship between the third side surface 93D of the first support 93 and the first back yoke 21. Thus, the second stator 30 is positioned in the radial direction through the contact between the second back yoke 31 and the third side surface of the second support 94.

The recess 94C of each second support 94 is in contact with the corresponding first stator claw magnetic pole 22 of the first stator 20 in the circumferential direction and the radial direction. The relationship between the recess 94C of the second support 94 and the first stator claw magnetic pole 22 is substantially the same as the relationship between the recess 93C of the first support 93 and the first stator claw magnetic pole 32. Thus, the first stator 20 is positioned in the circumferential direction and the radial direction through the contact between the first stator claw magnetic pole 22 and the recess 94C of the second support 94. Accordingly, in the stator iron cores 11 adjacent to each other in the axial direction, one of the stator iron cores 11 is positioned by the first supports 93 and the other one of the stator iron cores 11 is positioned by the second supports 94.

The insulating portion 91 of the interphase insulating member 90 is in contact with, in the axial direction, the tips 24A, 34A of one of the stator claw magnetic poles 22, 32 extending toward the insulating portion 91 in the first stator claw magnetic poles 22 and the second stator claw magnetic poles 32 of the stator iron core 11 adjacent to the insulating portion 91. For example, the first surface 91A of the insulating portion 91 is in contact with the tips 34A of the second stator claw magnetic poles 32 in the axial direction, and the second surface 91C of the insulating portion 41 is in contact with the tips 24A of the first stator claw magnetic poles 22 in the axial direction. The insulating portion 91 does not have to be in contact with, in the axial direction, the tips 24A, 34A of one of the stator claw magnetic poles 22, 32 extending toward the insulating portion 91 in the first stator claw magnetic poles 22 and the second stator claw magnetic poles 32 of the stator iron core 11 adjacent to the insulating portion 91.

In addition to advantages (1-1) to (1-10) of the first embodiment, the present embodiment provides the following advantage.

(3-1) The supports 92 are in contact with one of the first stator claw magnetic poles 22 and the second stator claw magnetic poles 32 of the stator iron cores 11 adjacent to the insulating portion 91 in the circumferential direction and are in contact with the other one of the first stator claw magnetic poles 22 and the second stator claw magnetic poles 32 in the circumferential direction and the radial direction. In this structure, in the stator iron cores 11 adjacent to the insulating portion 91, one of the first stator 20 and the second stator 30 is positioned in the circumferential direction through the contact between the first stator claw magnetic poles 22, 32 and the supports 92 and the other one of the first stator 20 and the second stator 30 is positioned in the circumferential direction and the radial direction through the contact between the second stator claw magnetic poles 22, 32 and the supports 92. This allows the stator iron cores 11 to be positioned relative to each other in the circumferential direction and the radial direction in a favorable manner. In addition, the first stator 20 and the second stator 30 are positioned in the circumferential direction and the radial direction without complicating the structure of the stator iron core 11.

Fourth Embodiment

Figure 17:
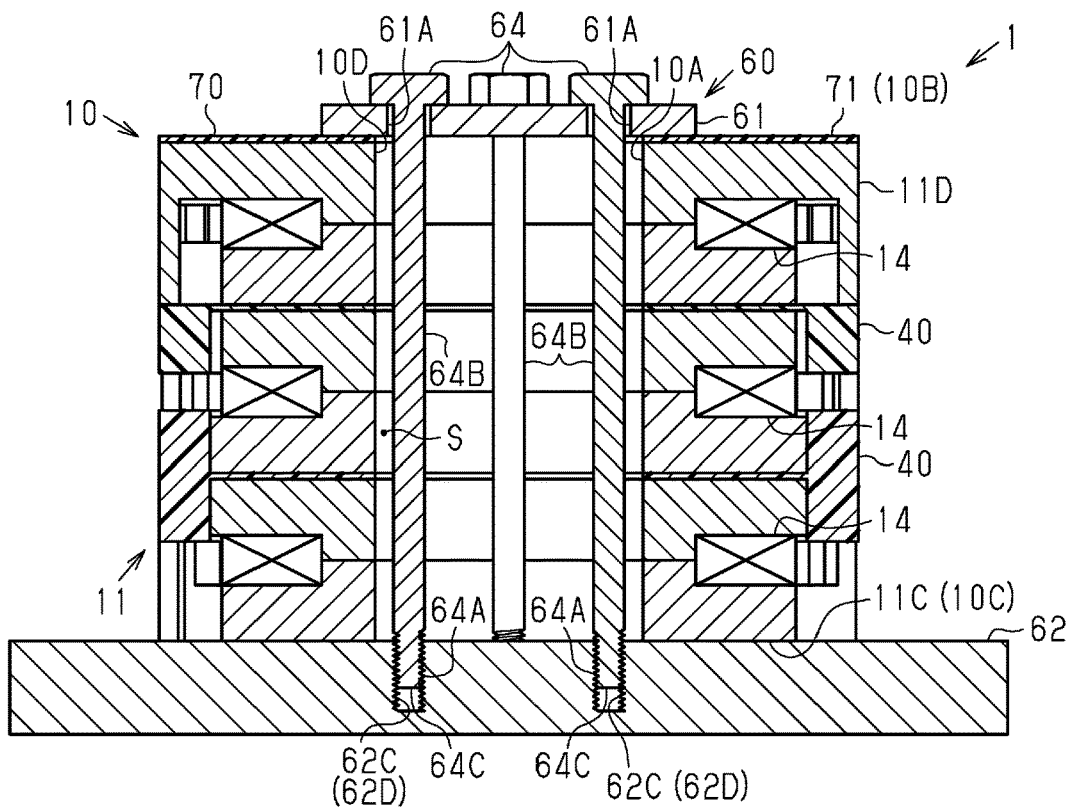
FIG. 17 is a cross-sectional view taken along the axial direction of the rotor in the motor according to a fourth embodiment.

The motor 1 according to a fourth embodiment will now be described with reference to FIG. 17. The motor 1 of the present embodiment differs from the motor 1 of the first embodiment in the structure of the fixing member 60. In the following description, to facilitate understanding, like or the same reference numerals are given to those components that have the same functions as the corresponding components of the motor 1 according to the first embodiment. The functions of the components will not be described. FIG. 17 shows the cross-section of the motor 1 without the rotor 50.

The fixing member 60 includes the first end plate 61, the second end plate 62, and rod portions 64. Each rod portion 64 is insertable into the through-hole 10A of the stator 10. The number of the rod portions 64 is, for example, four. The rod portions 64 are spaced apart from each other in the circumferential direction. For example, the rod portions 64 are arranged at equal intervals in the circumferential direction. The rod portions 64 and the first and second end plates 61, 62 are fixed with the rod portions 64 inserted into the through-hole 10A of the stator 10 and the stator 10 held between the first end plate 61 and the second end plate 62 in the axial direction. In the present embodiment, the first end plate 61, the second end plate 62, and the rod portions 64 are separate from each other. The number of the rod portions 64 may be less than or equal to three or may be greater than or equal to five.

The rod portions 64 each include a thread groove 64A. The thread groove 64A is formed on an outer circumferential surface 64B of the rod portion 64. For example, the thread groove 64A is formed on a tip 64C of the rod portion 64. The rod portions 64 of the present embodiment are bolts. Each rod portion 64 opposes the inner surface 10D of the through-hole 10A of the stator 10 in the radial direction with the gap S located in between. At least one of the first end plate 61 and the second end plate 62 includes a thread groove 62C that can be threaded to the thread groove 64A of each rod portion 64. The first end plate 61 includes insertion through-holes 61A through which the rod portions 64 are insertable. The second end plate 62 includes insertion holes 62D into which the rod portions 64 are insertable, instead of the insertion hole 62B of the first embodiment. For example, each of the insertion holes 62D of the second end plate 62 includes the corresponding thread groove 62C. The rod portions 64 are fixed to the second end plate 62 by inserting the rod portions 64 into the insertion holes 62D of the second end plate 62 through the insertion through-holes 61A of the first end plate 61 and through the through-hole 10A of the stator 10 and fastening the thread grooves 64A of the rod portions 64 to the thread grooves 62C of the second end plate 62. Thus, the stator 10 is fixed so as to be held between the first end plate 61 and the second end plate 62.

In addition to advantages (1-1) to (1-6) and (1-8) to (1-10) of the first embodiment, the present embodiment provides the following advantage.

(4-1) The rod portions 64 are spaced apart from each other in the circumferential direction. In this structure, the rod portions 64 are inserted into the through-hole 10A of the stator 10 to fix the rod portions 64 and the first and second end plates 61, 62. Accordingly, the stator 10 is fixed securely.

Fifth Embodiment

Figure 18:
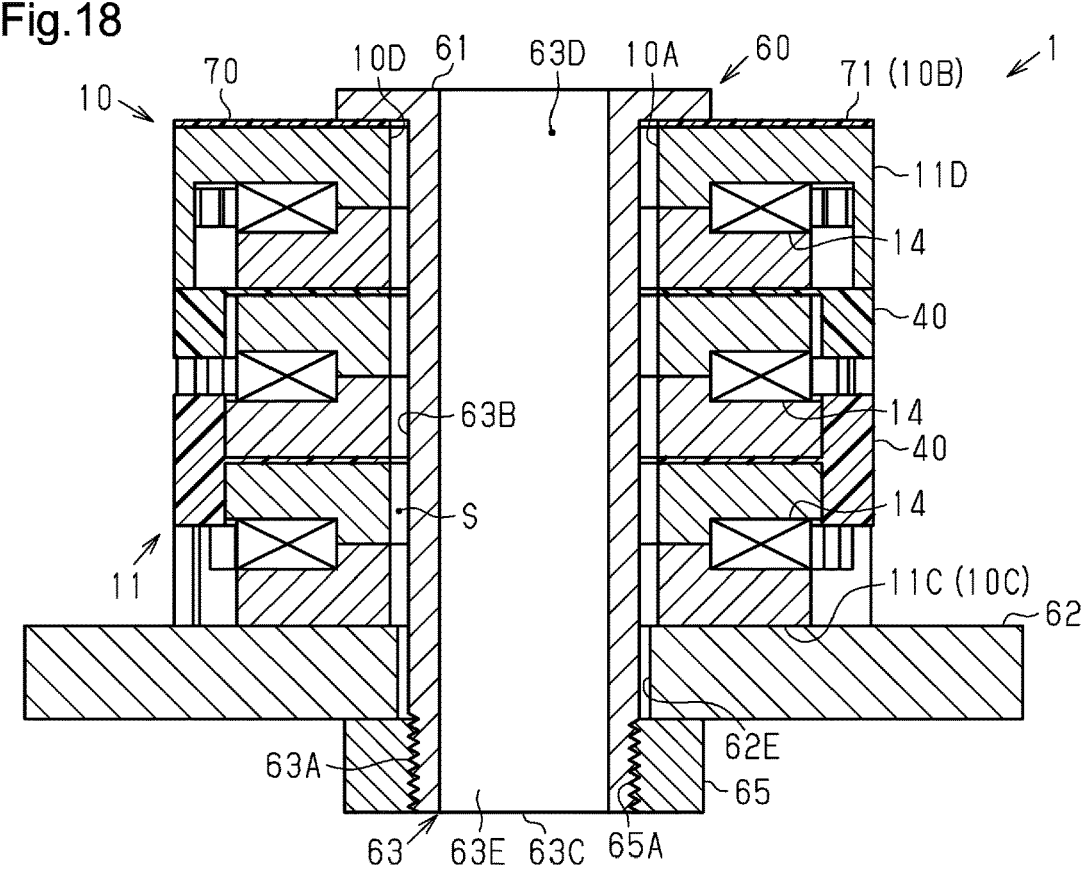
FIG. 18 is a cross-sectional view taken along the axial direction of the rotor in the motor according to a fifth embodiment.

The motor 1 according to a fifth embodiment will now be described with reference to FIG. 18. The motor 1 of the present embodiment differs from the motor 1 of the first embodiment in the structure of the fixing member 60. In the following description, to facilitate understanding, like or the same reference numerals are given to those components that have the same functions as the corresponding components of the motor 1 according to the first embodiment. The functions of the components will not be described. FIG. 18 shows the cross-section of the motor 1 without the rotor 50.

The fixing member 60 includes the first end plate 61, the second end plate 62, and one or more rod portions 63. At least one of the first end plate 61 and the second end plate 62 includes a through-hole 62E that extends through in the axial direction such that the rod portion 63 is insertable through the through-hole 62E. For example, the second end plate 62 includes the through-hole 62E, instead of the insertion hole 62B of the first embodiment. The fixing member 60 further includes a holding portion 65 with a thread groove 65A. The thread groove 65A of the holding portion 65 is capable of being fastened to the thread groove 63A of the rod portion 63. The holding portion 65 is arranged so as to oppose the stator 10 with at least one of the first end plate 61 and the second end plate 62 located in between. For example, the holding portion 65 is arranged so as to oppose the stator 10 with the second end plate 62 located in between. The holding portion 65 of the present embodiment is a nut.

The rod portion 63 has a specific length in the axial direction. The length of the rod portion 63 in the axial direction may be set to be greater than the sum of the thickness of the stator 10 in the axial direction and the thickness of the second end plate 62 in the axial direction. The length of the rod portion 63 in the axial direction is preferably set to be less than or equal to the sum of the thickness of the stator 10 in the axial direction, the thickness of the second end plate 62 in the axial direction, and the thickness of the holding portion 65 in the axial direction. In the present embodiment, the length of the rod portion 63 in the axial direction is set so as to coincide with the sum of the thickness of the stator 10 in the axial direction, the thickness of the second end plate 62 in the axial direction, and the thickness of the holding portion 65 in the axial direction. The length of the rod portion 63 in the axial direction may be set to be greater than the sum of the thickness of the stator 10 in the axial direction, the thickness of the second end plate 62 in the axial direction, and the thickness of the holding portion 65 in the axial direction.

The rod portion 63 and the holding portion 65 are fixed by inserting the rod portion 63 into the through-hole 10A of the stator 10 and the through-hole 62E of the second end plate 62 and fastening the thread groove 65A of the holding portion 65 to the thread groove 63A of the rod portion 63 that protrudes from the through-hole 62E of the second end plate 62. Thus, the stator 10 is fixed so as to be held between the first end plate 61 and the second end plate 62.

In addition to advantages (1-1) to (1-7), (1-9), and (1-10) of the first embodiment, the present embodiment provides the following advantage.

(5-1) The thread groove 63A of the rod portion 63 inserted into the through-hole 10A of the stator 10 is inserted through the through-hole 62E of the second end plate 62 and fastened to the thread groove 65A of the holding portion 65. This allows the stator 10 to be fixed with a simple structure.

Sixth Embodiment

Figure 19:
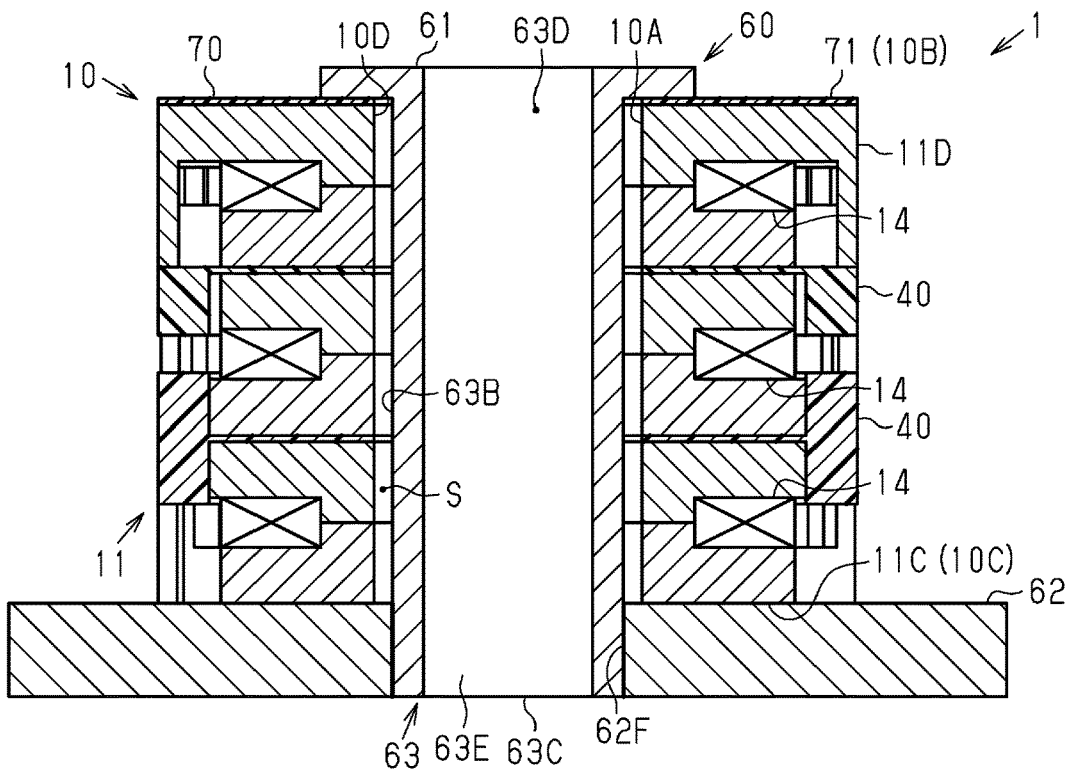
FIG. 19 is a cross-sectional view taken along the axial direction of the rotor in the motor according to a sixth embodiment.

The motor 1 according to a sixth embodiment will now be described with reference to FIG. 19. The motor 1 of the present embodiment differs from the motor 1 of the first embodiment in the structure of the fixing member 60. In the following description, to facilitate understanding, like or the same reference numerals are given to those components that have the same functions as the corresponding components of the motor 1 according to the first embodiment. The functions of the components will not be described. FIG. 19 shows the cross-section of the motor 1 without the rotor 50.

The fixing member 60 includes the first end plate 61, the second end plate 62, and one or more rod portions 63. At least one of the first end plate 61 and the second end plate 62 includes a hole 62F in the axial direction such that the rod portion 63 is insertable into the hole 62F. For example, the second end plate 62 includes the hole 62F, instead of the insertion hole 62B of the first embodiment. It is preferred that the rod portion 63 does not include the thread groove 63A.

The rod portion 63 and at least one of the first end plate 61 and the second end plate 62 are fixed in accordance with, for example, the following first or second example. In the first example, the rod portion 63 is engaged with the hole 62F of at least one of the first end plate 61 and the second end plate 62 through press-fitting, shrink-fitting, or cool-fitting. For instance, the rod portion 63 is engaged with the hole 62F of the second end plate 62 through press-fitting, shrink-fitting, or cool-fitting. In the second example, the rod portion 63 is bonded, welded, or fused to the hole 62F of at least one of the first end plate 61 and the second end plate 62. For instance, the rod portion 63 is bonded, welded, or fused to the second end plate 62. In this case, the rod portion 63 may be bonded, welded, or fused to the hole 62F of the second end plate 62. The second end plate 62 does not have to include the hole 62F.

In addition to advantages (1-1) to (1-7), (1-9), and (1-10) of the first embodiment, the present embodiment provides the following advantages.

(6-1) The stator 10 is fixed by engaging the rod portion 63 inserted into the through-hole 10A of the stator 10 with the hole 62F of the second end plate 62 through press-fitting, shrink-fitting, or cool-fitting. This structure allows the stator 10 to be fixed securely.

(6-2) The stator 10 is fixed by bonding, welding, or fusing the rod portion 63 inserted into the through-hole 10A of the stator 10 to the hole 62F. This structure allows the stator 10 to be fixed securely.

Seventh Embodiment

Figure 20:
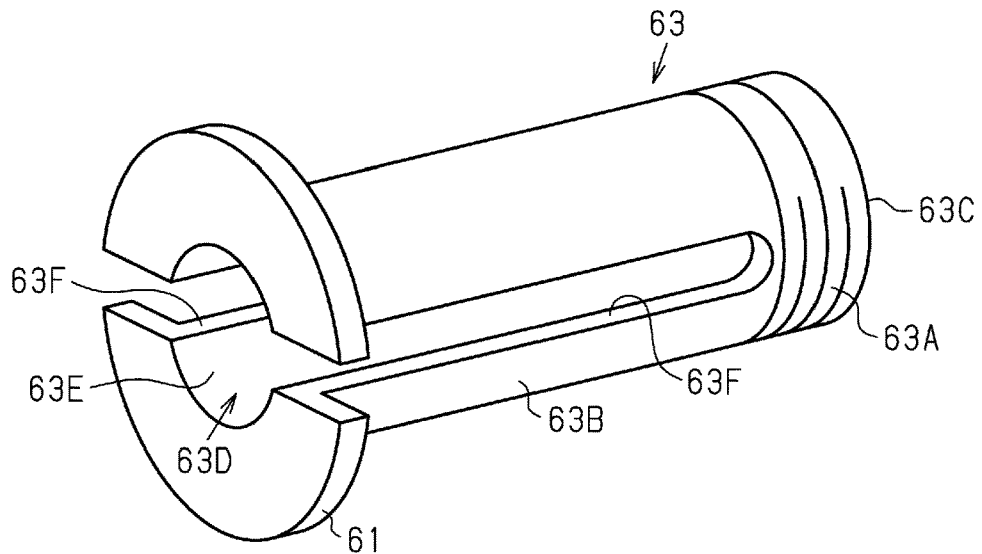
FIG. 20 is a perspective view showing the rod portion according to a seventh embodiment.

The motor 1 according to a seventh embodiment will now be described with reference to FIG. 20. The motor 1 of the present embodiment differs from the motor 1 of the first embodiment in the structure of the rod portion 63. In the following description, to facilitate understanding, like or the same reference numerals are given to those components that have the same functions as the corresponding components of the motor 1 according to the first embodiment. The functions of the components will not be described.

The rod portion 63 includes an internal space 63D. The rod portion 63 includes through portions 63F that extend in the radial direction through the outer circumferential surface 63B of the rod portion 63 and an inner circumferential surface 63E. The inner circumferential surface 63E defines the internal space 63D. The through portions 63F are, for example, slits extending in the axial direction. The through portions 63F are each sized such that the coil 14 of the stator 10 can be drawn out of the through portion 63F. The number of the through portions 63F is, for example, two. The two through portions 63F are, for example, arranged in the rod portion 63 so as to oppose each other in the radial direction. For example, the through portions 63F are continuously arranged in the first end plate 61 and the rod portion 63. The through portions 63F may be arranged only in the rod portion 63.

In addition to advantages (1-1) to (1-10) of the first embodiment, the present embodiment provides the following advantage.

(7-1) The rod portion 63 includes the through portions 63F extending in the radial direction through the outer circumferential surface 63B and the inner circumferential surface 63E, which defines the internal space 63D. This structure allows the coil 14 of the stator 10 to be easily drawn out of the through portions 63F. Additionally, the motor 1 has a reduced weight.

Modifications

The above-described embodiments exemplify, without any intention to limit, an applicable form of a stator and a motor including the stator related to the present invention. The stator and the motor including the stator related to the present disclosure can take a form different from the form illustrated in the embodiment. In one example, some of the components of the above-described embodiments may be replaced, changed, or omitted. Alternatively, another component may be added to the above-described embodiments. In the following modifications, the same reference characters are given to those elements that are the same as the corresponding elements of the above-described embodiments. Such elements will not be described in detail.

Figure 21:
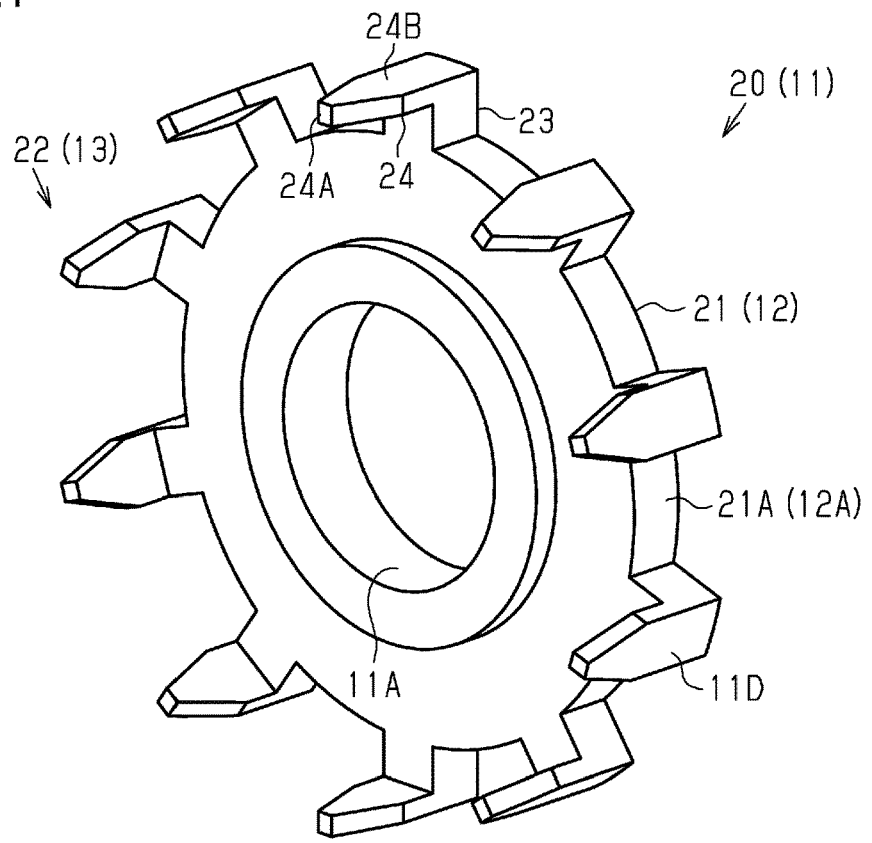
FIG. 21 is a perspective view showing the first stator of the stator iron core according to a modification.
Figure 22:
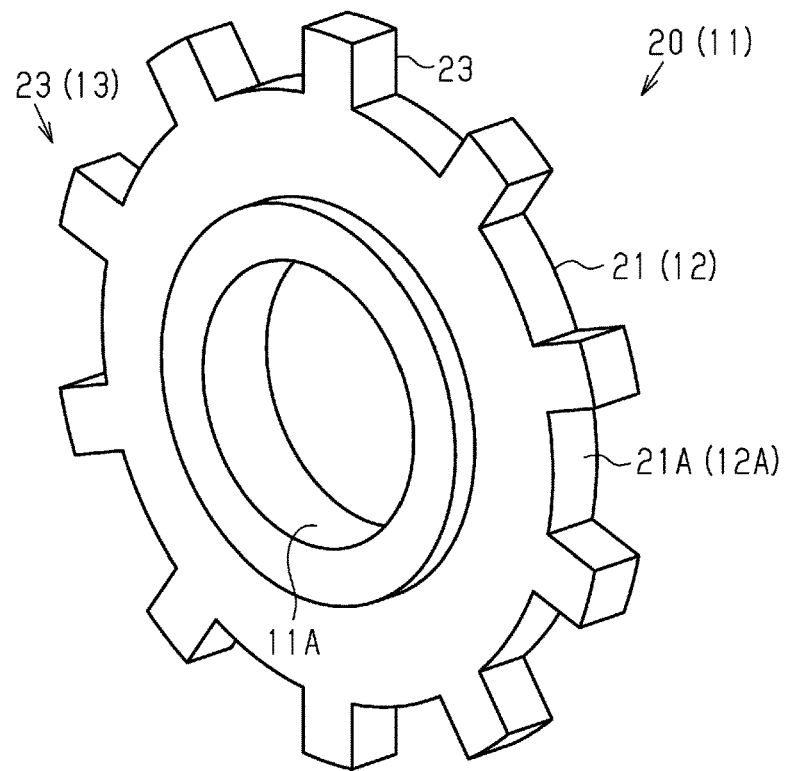
FIG. 22 is a perspective view showing the first stator of the stator iron core according to a modification.
Figure 23:
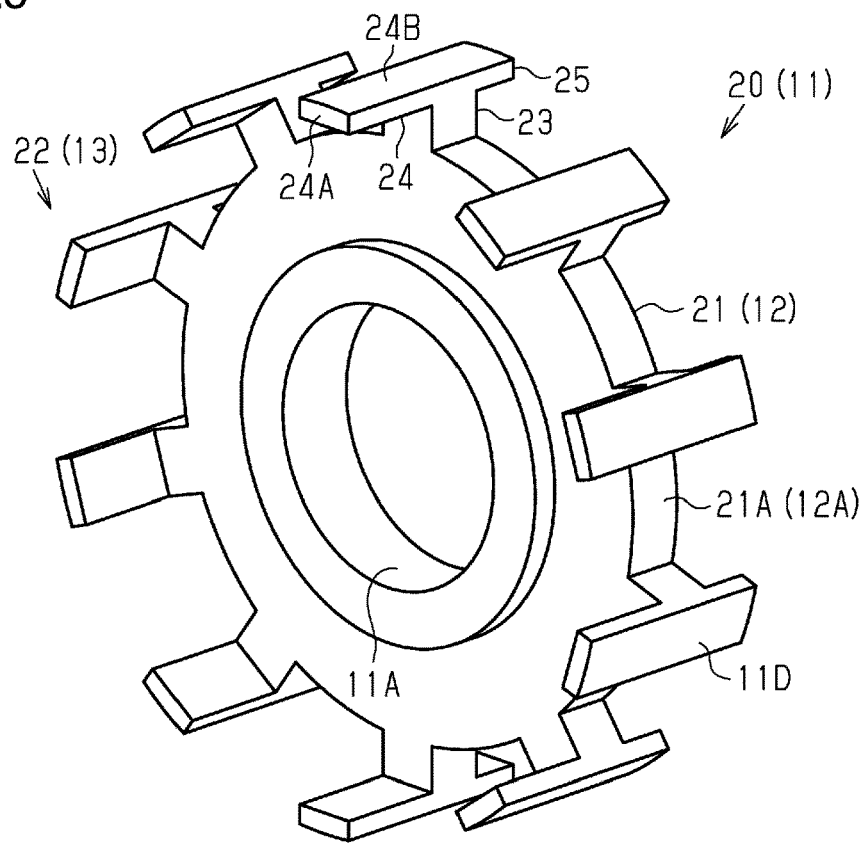
FIG. 23 is a perspective view showing the first stator of the stator iron core according to a modification.

In each of the above-described embodiments, the structure of each stator iron core 11 may be changed. In a first example, as shown in FIG. 21, each first stator claw magnetic pole 22 of the first stator 20 includes a tapered tip 24A. For instance, the tip 24A of each first stator claw magnetic pole 22 is tapered in the circumferential direction. The same modification is applied to the second stator 30. In a second example, as shown in FIG. 22, each first stator claw magnetic pole 22 of the first stator 20 does not include the corresponding second claw magnetic pole 24. In this case, each second stator claw magnetic pole 32 preferably includes the corresponding first claw magnetic pole 33 and the corresponding second claw magnetic pole 34. In a third example, as shown in FIG. 23, each first stator claw magnetic pole 22 of the first stator 20 further includes a third claw magnetic pole 25 in addition to the corresponding first claw magnetic pole 23 and the corresponding second claw magnetic pole 24. The third claw magnetic pole 25 extends, for example, in the axial direction from the first claw magnetic pole 23 toward a side opposite from the second claw magnetic pole 24. The length of the third claw magnetic pole 25 in the axial direction is shorter than the length of the second claw magnetic pole 24 in the axial direction. The same modification is applied to the second stator 30. In a fourth example, the stator iron cores 11 are each formed using a magnetic steel sheet. In a fifth example, each stator iron core 11 does not include the through-hole 11A. In this case, the stator 10 is fixed using a fixing member that differs from the fixing member 60. The stator iron core 11 may be manufactured through molding. The through-hole 70A does not have to include the through-hole 70A. The interphase insulating members 40, 80, 90 do not have to include the through-holes 40A, 80A, 90A, respectively.

In each of the above-described embodiments, the structure of each stator 10 may be changed. In a first example, the stator 10 is a claw-pole stator having two or less phases or having four or more phases. In this case, the number of the stator iron cores 11 is two or is or four or more. In a second example, the stator 10 does not include the fixing member 60. In this case, the stator iron core 11 is, for example, press-fitted to a support member that is insertable through the through-hole 10A of the stator 10.

The structure of the motor 1 may be changed. For example, the motor 1 is an inner rotor motor.

While the embodiments of the present device have been described herein above, it is to be appreciated that various changes in form and detail may be made without departing from the spirit and scope of the present device described in the claims.

What is claimed is:

1. A stator, comprising:
   stator iron cores stacked in a rotor axial direction; and
   an interphase insulating member arranged between the stator iron cores,
   each of the stator iron cores including a circular back yoke and a stator claw magnetic pole that protrudes from the back yoke in a rotor radial direction, each of the stator iron cores including a first stator and a second stator arranged in a rotor axial direction, the first stator including a circular first back yoke and a first stator claw magnetic pole that protrudes from the first back yoke in the rotor radial direction, and the second stator including a circular second back yoke and a second stator claw magnetic pole that protrudes from the second back yoke in the rotor radial direction, the interphase insulating member including an insulating portion, arranged between adjacent ones of the stator iron cores, and a plurality of supports, at least one of the plurality of supports is in contact with, in the rotor circumferential direction, the first stator claw magnetic pole and the second stator claw magnetic pole of one of the stator iron cores adjacent to the insulating portion, at least other one of the plurality of supports is in contact with, in the rotor circumferential direction, the first stator claw magnetic pole and the second stator claw magnetic pole of an other of the stator iron cores adjacent to the insulating portion, and the first stator is positioned via the plurality of supports with a first predetermined deviation from the second stator of a same stator iron core and the stator iron cores are positioned via the plurality of supports with a second predetermined deviation from the adjacent stator iron core.

2. The stator according to claim 1, wherein
the support includes
a first support extending in the rotor axial direction from a first surface of the insulating portion in the rotor axial direction and
a second support extending in the rotor axial direction from a second surface on a side opposite from the first surface of the insulating portion, and
the first support is located at a position that differs from a position of the second support in the rotor circumferential direction of the rotor.

3. The stator according to claim 1, wherein
the first stator claw magnetic pole protrudes from the first back yoke in the rotor radial direction and extends at least toward the second stator in the rotor axial direction, and
the second stator claw magnetic pole protrudes from the second back yoke in the rotor radial direction, and extends at least toward the first stator in the rotor axial direction such that a void is created between the first stator claw magnetic pole and the second stator claw magnetic pole in the rotor circumferential direction of the rotor.

4. The stator according to claim 3, wherein
the insulating portion is in contact with, in the rotor axial direction, a tip of one of the stator claw magnetic poles extending toward the insulating portion in the first stator claw magnetic pole and the second stator claw magnetic pole of the stator iron core adjacent to the insulating portion.

5. The stator according to claim 1, wherein
the support
is in contact with, in the rotor circumferential direction, one of the first stator claw magnetic pole and the second stator claw magnetic pole of the stator iron core adjacent to the insulating portion and
is in contact with, in the rotor radial direction, the other one of the first stator claw magnetic pole and the second stator claw magnetic pole.

6. The stator according to claim 1, wherein
each of the stator iron cores is formed using a powder magnetic core.

7. A motor including the stator according to claim 1, the motor further comprising:
a rotor that defines the rotor axial direction, the rotor radial direction and the rotor circumferential direction.

8. The stator according to claim 2, wherein
each of the stator iron cores is formed using a powder magnetic core.

9. A motor including the stator according to claim 2, the motor further comprising:
a rotor that defines the rotor axial direction, the rotor radial direction and the rotor circumferential direction.

10. A motor including the stator according to claim 6, the motor further comprising:
a rotor that defines the rotor axial direction, the rotor radial direction and the rotor circumferential direction.

11. A stator, comprising:
stator iron cores stacked in a rotor axial direction; and
an interphase insulating member arranged between the stator iron cores,
each of the stator iron cores including a circular back yoke and a stator claw magnetic pole that protrudes from the back yoke in a rotor radial direction,
each of the stator iron cores including a first stator and a second stator arranged in a rotor axial direction,
the first stator including a circular first back yoke and a first stator claw magnetic pole that protrudes from the first back yoke in the rotor radial direction,
the first stator claw magnetic pole protruding from the first back yoke in the rotor radial direction and extends at least toward the second stator in the rotor axial direction,
the second stator including a circular second back yoke and a second stator claw magnetic pole that protrudes from the second back yoke in the rotor radial direction,
the second stator claw magnetic pole protruding from the second back yoke in the rotor radial direction, and extending at least toward the first stator in the rotor axial direction such that a void is created between the first stator claw magnetic pole and the second stator claw magnetic pole in the rotor circumferential direction,
the interphase insulating member including an insulating portion, arranged between adjacent ones of the stator iron cores, and a plurality of supports,
at least one of the first stator claw magnetic poles and the second stator claw magnetic poles of one of the stator iron cores adjacent to the insulating portion being in contact with the plurality of supports in the rotor circumferential direction,
at least one of the first stator claw magnetic poles and the second stator claw magnetic poles of another one of the stator iron cores adjacent to the insulating portion being in contact with the plurality of supports in the rotor circumferential direction,
the stator iron cores are positioned via the plurality of supports with a predetermined deviation from adjacent stator iron cores,
the insulating portion being in contact with, in the rotor axial direction, a tip of one of the stator claw magnetic poles extending toward the insulating portion in the first stator claw magnetic pole and the second stator claw magnetic pole of the stator iron core adjacent to the insulating portion.

12. The stator according to claim 11, wherein
the support is in contact with, in the rotor circumferential direction, the first stator claw magnetic pole and the second stator claw magnetic pole of the stator iron core adjacent to the insulating portion.

\* \* \* \* \*